US012514615B2

(12) United States Patent
Saldanha et al.

(10) Patent No.: US 12,514,615 B2
(45) Date of Patent: Jan. 6, 2026

(54) EXTERNAL FIXATOR SYSTEM WITH CUSTOM ASSEMBLED STRUTS

(71) Applicant: Kiran Saldanha Limited, Liverpool (GB)

(72) Inventors: Kiran Antony Nelson Saldanha, Liverpool (GB); Yogesh Rao Narayan Kale, Bengaluru (IN)

(73) Assignee: Kiran Saldanha Limited, Liverpool (GB)

( * ) Notice: Subject to any disclaimer, the term of this patent is extended or adjusted under 35 U.S.C. 154(b) by 104 days.

(21) Appl. No.: 18/565,836

(22) PCT Filed: May 30, 2022

(86) PCT No.: PCT/IB2022/055067
§ 371 (c)(1),
(2) Date: Nov. 30, 2023

(87) PCT Pub. No.: WO2022/254320
PCT Pub. Date: Dec. 8, 2022

(65) Prior Publication Data
US 2024/0260996 A1   Aug. 8, 2024

(51) Int. Cl.
*A61B 17/66* (2006.01)
*A61B 17/88* (2006.01)
*A61B 17/00* (2006.01)
*A61B 17/60* (2006.01)

(52) U.S. Cl.
CPC .......... *A61B 17/66* (2013.01); *A61B 17/8875* (2013.01); *A61B 2017/00991* (2013.01); *A61B 2017/606* (2013.01)

(58) Field of Classification Search
CPC ................ A61B 17/8875; A61B 17/66; A61B 2017/00991; A61B 2017/606
See application file for complete search history.

(56) References Cited

U.S. PATENT DOCUMENTS

| 6,036,386 | A | 3/2000 | McDonald |
| 9,681,892 | B2 | 6/2017 | Ross et al. |
| 9,808,289 | B2 | 11/2017 | Ross et al. |

(Continued)

FOREIGN PATENT DOCUMENTS

| EP | 3354214 A1 | 8/2018 |
| WO | 2020092049 A1 | 5/2020 |
| WO | 2021061816 A1 | 4/2021 |

OTHER PUBLICATIONS

International Search Report rendered by the International Searching Authority for PCT/IB2022/055067, dated Oct. 12, 2022, 6 pages.

(Continued)

*Primary Examiner* — Sameh R Boles
(74) *Attorney, Agent, or Firm* — Skaar Ulbrich Macari, P.A.

(57) ABSTRACT

An external bone fixation system includes a first platform which is a ring around the limb holding a segment of bone, a second platform which is another ring around the limb holding another segment of bone, interconnected with six length-adjustable telescoping custom-assembled struts using connecting elements in the form of strut connectors consisting of pivoting and rotating holders that allow three degrees of rotational freedom for each strut.

14 Claims, 40 Drawing Sheets

(56) References Cited

U.S. PATENT DOCUMENTS

| | | |
|---|---|---|
| 9,820,776 B2 | 11/2017 | Cresina et al. |
| 10,470,800 B2 | 11/2019 | Bordeaux et al. |
| 10,743,918 B2 | 8/2020 | Samchukov et al. |
| 10,751,089 B2 | 8/2020 | Wigginton et al. |
| 11,076,801 B2 | 8/2021 | Cohen et al. |
| 11,457,950 B2 * | 10/2022 | Lavoritano ........ A61B 17/6416 |
| 11,596,442 B2 * | 3/2023 | Samchukov ....... A61B 17/6475 |
| 2011/0004199 A1 | 1/2011 | Ross et al. |
| 2016/0022314 A1 | 1/2016 | Bordeaux et al. |
| 2018/0344354 A1 | 12/2018 | Mullaney |
| 2020/0253640 A1 * | 8/2020 | Mullaney .................. G06T 7/74 |
| 2021/0085368 A1 | 3/2021 | Mannanal |

OTHER PUBLICATIONS

Written Opinion rendered by the International Searching Authority for PCT/IB2022/055067, dated Oct. 12, 2022, 13 pages.

* cited by examiner

EXTERNAL FIXATOR SYSTEM WITH CUSTOM ASSEMBLED STRUTS

PRIORITY

This application claims the priority of Indian patent application 202141024193, filed May 31, 2021, which is hereby incorporated herein by reference in its entirety.

FIELD

The present invention relates to ring external fixators with custom assembled struts.

BACKGROUND

Ring external fixators, also called circular external fixators or Ilizarov fixators, provide multiplanar fixation of bone. They are used to stabilise fractures and to correct bone deformity. A ring external fixator is constructed by placing at least two rings around the limb, each ring holding a segment of bone via fine wires or threaded bone pins that are inserted into bone and attached to the holes in the ring and connecting the two rings with threaded rods. The bone segments can be manipulated to correct bone deformity by manipulating the rings using hinges for angular correction, translation blocks for correction of translation and rotational blocks for correction of rotation.

Hexapod external fixation devices are modified ring external fixators where the two rings are connected with six telescoping struts. They are based on Stewart platform where the six telescoping struts act as six degree of freedom (6 DOF) parallel manipulators allowing manipulation of bone segments in all three orthogonal axes translations and all rotations about those orthogonal axes. This enables simultaneous change in bone length (lengthening or shortening), rotation (internal or external), translation (anterior or posterior or medial or lateral) and angulation (anterior or posterior or medial or lateral).

The six telescoping struts are connected to the rings so that the struts extend between the rings from one ring to the other. Connections between the rings and struts necessitate the use of either a cardan type universal joint in combination with a rotating joint or a spherical joint usually in the form of a ball and socket to allow three degrees of rotational freedom for each strut.

One drawback of using universal joints in combination with rotating joint is that the functional length of the struts is reduced due to the space taken up by the universal joints. Another drawback is the instability due to the mechanical clearance needed at the universal joints formed by a pivot pin loosely held by two rotating parts. Spherical ball and socket joints do not have such instability, but their drawback is that there is insufficient spatial clearance between the two rings for them to have adequate range of movement at the ball joint necessary to produce the adjustments needed to alter the orientation of the struts and the rings. Some hexapod devices have overcome this drawback by having ball joint in combination with rotating joint that can be attached to the outer surface of the ring. Manipulation of bone segments using hexapod external fixator is performed by adjusting the length of the telescopic struts. Each strut has a threaded rod partially disposed inside of a cylindrical body of the strut that has an adjustment nut that mates with the threaded rod. Adjustment of overall length of the strut is made possible by the telescoping of the threaded rod portion of the strut relative to the cylindrical body portion of the strut. The amount of length adjustment that can be performed is limited by the range of excursion available for the threaded rod within the cylindrical body of the strut which is determined by the length of the threaded rod and the length of the cylindrical body of the strut. The finite range within which the strut length can be adjusted may be insufficient for a particular situation where a longer or a shorter strut may be needed during the course of deformity correction.

This problem is addressed in prior art devices by having struts of various lengths in stock so that when a strut runs out of range during the course of deformity correction, it is changed to a longer or shorter strut as necessary. This is both expensive and time consuming for the patient and the treating team, and it requires excessive amount of inventory. The strut changes are usually carried out in out-patient clinics where the struts of various sizes need to be held in stock. Furthermore, when the hexapod external fixator is first applied to the limb, a strut attached to the two rings of the hexapod external fixator may be already nearing its limit of range of excursion available for length adjustment, necessitating change of strut soon after starting the correction program. In addition, the six struts in the hexapod construct may run out of range of excursion at various times during the course of correction, necessitating multiple hospital visits for changing each of those struts.

All prior art hexapod external fixation devices, whether they use cardan type universal joints or ball and socket joints, have factory assembled struts where these joints are irreversibly coupled to the two ends of the strut: to the threaded rod portion of the strut at one end and to the cylindrical body portion of the strut at the other end. The two ends of the threaded rods are also modified to provide anchoring points so that they are irreversibly coupled during their manufacture in the factory, to the universal joints or ball and socket joints at one end and to the cylindrical body at the other end. When these factory-assembled struts run out of range of length adjustment, entire strut needs to be changed.

One prior art invention (patent number US 2018/0344354 A1) relates to struts whose lengths can be extended using an external threaded add on portion configured to attach to the threaded rod portion of the strut. Although the length of these factory-assembled struts can be increased using add-on rods, they cannot be shortened beyond their shortest possible length. Furthermore, some of these struts may be nearly reaching their maximum length at the time of application of hexapod external fixator to the limb, necessitating a hospital visit to extend the length using external add-on threaded rods. The joints situated at the connection between these struts and the rings that allow three degrees of rotational freedom for the struts, are irreversibly coupled to the struts during their manufacture in the factory. The body of these struts includes the first joint at an end portion thereof configured to couple to a fixation platform and the rod portion includes a second joint at an end portion thereof configured to couple to a fixation platform.

Most prior art hexapod external fixation devices have strut mounts or tabs that are integrated into the rings, necessitating attachment of the struts to certain fixed position holes in the rings. In some clinical situations it may not be possible to attach the struts to these fixed position holes in the rings due to the severely deformed limb impinging on the strut.

U.S. Pat. No. 6,036,386 discloses an orthopedic fixation device in which two or more translation members are secured to adjacent tissue segments for reorientation relative to each other. The device includes telescopically adjustable struts that can be secured to base members by connectors that permit movement of the struts relative to the base members. Rotation of the struts is possible about three axes that intersect at a single coincident point of universal rotation.

The aforementioned invention relates to ring external fixator that has telescoping struts with cardan type universal joints at either end. The struts are factory assembled and therefore have a fixed range of excursion for length adjustment whereas the proposed invention has custom struts assembled by the Surgeon so that optimum range of excursion is available for the struts to perform the deformity correction program.

U.S. Pat. No. 9,681,892 B2 provides an external fixation strut for an external fixation device having a ball joints that can be attached to the outer or inner Surface of the ring and locked to increase overall stability of the external fixation device. Some embodiments of the fixation strut include a first ball joint coupled to a first end portion of a strut housing, the strut housing having an axial bore defined therethrough. A second ball joint is coupled to a second end portion of an elongated member. The elongated member is coupled to an adjustment mechanism, which is coupled to an upper end portion of an adjustment sleeve. The adjustment sleeve is slidably disposed in the axial bore of the Strut housing, and is used to effect coarse strut length adjustments. Gradual strut adjustments are effected by translating the elongated member.

The aforementioned invention relates to telescoping strut with ball joints at either end. It is factory assembled and therefore has a fixed range of excursion for length adjustment whereas the proposed invention has custom struts assembled by the Surgeon so that optimum range of excursion is available for the struts to perform the deformity correction program.

U.S. Pat. No. 9,808,289 B2 includes an external fixator ring that includes a central opening, inner and outer ring surfaces and upper and lower ring surfaces. In some embodiments, one or more apertures are defined in the inner or outer surface for receiving securing devices. The apertures in the inner or outer surface are adapted to provide rigid attachment for connection struts while allowing for a range of motion between the interconnected rings.

The aforementioned invention relates to an external fixator ring with apertures on the outer surface for receiving securing devices whereas the proposed invention has rings with apertures connecting the upper and lower surfaces and indentations around the apertures to provide rotational stability to the attachments.

U.S. Pat. No. 9,820,776 B2 discloses a ratcheting strut comprising: (a) a ratchet box including a through passage; (b) a first tube sized to extend at least partially through the passage, the first tube including teeth that engage corresponding teeth of the ratchet box; (c) a second tube mounted to the ratchet box in parallel with the first tube, the second tube operatively coupled to a second fixation adapter; and, (d) a threaded rod operatively coupled to a nut and a first fixation adapter, the threaded rod repositionably mounted to the first tube, where the nut is operatively coupled and repositionable with respect to the first tube.

The aforementioned invention relates to struts that have a ratcheting mechanism. The struts are factory assembled whereas the struts in the proposed invention are custom assembled by the Surgeon so that optimum range of excursion is available for the struts to perform the deformity correction program.

EP 3 354 214 A1 discloses strut attachments for external fixation frames. The strut attachments provide solutions for frame configurations in which it is not possible to attach a strut at its ends to corresponding rings. The strut attachments may be considered an outrigger type of mechanism that achieves more travel out of completely collapsed struts. The strut attachments, each having a pivot and a hinge joint, allow a strut to be attached on the level of a first ring and extend at least partially proximally or distally to a second ring depending on the frame of reference of the ring system. These strut attachments may be used when the fully collapsed length of the strut will not allow the rings to get any closer to one another than is needed or proscribed. In such cases, the strut attachments allow for even tighter ring to ring distance.

The aforementioned invention relates to strut attachments to which factory assembled struts can be attached. Threaded rods cannot be directly connected to the strut attachments nor can they be changed to a different length threaded rods within the strut. The pivoting axes of the two pivots in the strut attachments do not intersect with the longitudinal axis of the strut. Whereas the struts in the proposed invention are custom assembled by the Surgeon using optimum length threaded rods and the threaded rods can be directly attached by the Surgeon to strut connectors. Furthermore, rotation of the custom struts is possible about three axes that intersect at a single coincident point of universal rotation where the Surgeon can attach the threaded rod or custom strut to the strut connector.

US 2018/0344354 A1 provides external bone fixation systems. The systems include one or more pairs of bone fixation platforms in the form of rings or partial rings. The platforms may be coupled to corresponding bone segments. The pair of platforms are configured to accept a plurality of struts extending therebetween. The struts are configured to attach to the platforms via joints that provide three degrees of rotation. The struts are also configured such that their longitudinal length extending between the joints/platforms can be incrementally adjusted while attached to the plat forms. The struts are further configured such that their total range of length adjustment can be increased by coupling at least one add-on component to the struts in situ. The lengths of each of the plurality of struts may be adjusted to arrange the platforms, and thereby the bone segment coupled thereto, in particular relative positions and orientations.

The aforementioned invention relates to struts that are factory assembled whose lengths can be extended using an external threaded add on portion configured to attach to the threaded rod portion of the strut. Although the length of these struts can be increased using add-on rods, they cannot be shortened beyond their shortest possible length because the threaded rod of the factory assembled strut cannot be changed by the Surgeon. Furthermore, the strut may be already nearing its maximum length at the time of application of hexapod external fixator to the limb, necessitating a hospital visit to extend the length using external add-on threaded rods. The joints at the connection between the struts and the rings that allow three degrees of rotational freedom for these struts are irreversibly coupled to the struts during their manufacture in the factory. The strut body includes the first joint at an end portion thereof configured to couple to a fixation platform and the rod portion includes a second joint at an end portion thereof configured to couple to a fixation platform. In contrast, the custom struts of the proposed invention can be assembled by the Surgeon so that optimum range of excursion is available for the struts to perform the deformity correction program. If the custom strut runs out of range of excursion during the course of correction, the Surgeon can simply change the threaded rod rather than change the entire strut. This is made possible because the joints at the connection between the struts and the rings that allow three degrees of rotational freedom for these struts are not coupled to the struts during their manufacture in the factory. Instead, the Surgeon can choose a threaded rod of optimum length, assemble the custom strut and attach it to the strut connector at the coincident point of universal rotation where the three axes of rotation of the strut intersect.

U.S. Pat. No. 10,470,800 B2 discloses embodiments related to an external bone fixation device configured to correct bone deformities or repair bone injuries. The device can include a plurality of bases configured to be attached to portions of a bone and a plurality of struts configured to be adjustable in length to change the position and orientation of the plurality of bases and the attached bone portions.

The aforementioned invention relates to ring external fixator that has telescoping struts with universal joints at either end. The struts are factory assembled and therefore have a fixed range of excursion for length adjustment whereas the proposed invention has custom struts assembled by the Surgeon so that optimum range of excursion is available for the struts to perform the deformity correction program.

U.S. Pat. No. 10,743,918 B2 discloses a connecting rod for an external fixation device which may include a telescopic housing having an axial bore, an inner sleeve slidably disposed within the axial bore of the telescopic housing, a fastener operable to releasably couple the inner sleeve and the telescopic housing, an elongated member coupled to the inner sleeve, and two joints. One joint may be coupled to a proximal end of the telescopic housing and include a rotatable member and a connecting member coupled to the rotatable member, such that the connecting member is operable to receive a connecting element from an external fixation ring. The other joint may be coupled to a distal end of the elongated member and include a rotatable member and a connecting member coupled to the rotatable member. Each joint may also include a rotatable member housing with one or more sidewall grooves that limit rotation of the respective rotatable members.

The aforementioned invention relates to telescoping strut with ball joints at either end. It is factory assembled and therefore has a fixed range of excursion for length adjustment whereas the proposed invention has custom struts assembled by the Surgeon so that optimum range of excursion is available for the struts to perform the deformity correction program.

U.S. Pat. No. 10,751,089 B2 provides a telescoping, adjustable orthopedic strut for use in conjunction with an external bone fixation (EBF) device and an EBF device that employs the strut. The strut includes swivel hinges at each end, wherein each swivel hinge is lockable in any position within a one hundred eighty degree (180°) plane and has a three hundred sixty degree (360°) angle of rotation with respect to an orthopedic plate of the EBF device; an outer sleeve; an inner sleeve configured to slide within the outer sleeve; wherein the inner sleeve and outer sleeve may be positioned and fixed with respect to each other to provide an acute adjustment of the length of the strut; a leadscrew threaded into the inner sleeve, wherein the lead screw can be either rotated or fixed in position to provide a fine adjustment of the length of the strut.

The aforementioned invention relates to telescoping strut with lockable swivel hinge joints at either end. It is factory assembled and therefore has a fixed range of excursion for length adjustment whereas the proposed invention has custom struts assembled by the Surgeon so that optimum range of excursion is available for the struts to perform the deformity correction program.

U.S. Pat. No. 11,076,801 B2 discloses an electrical circuitry fitted to be connected or to be an integral part of a bone fixation device having at least one linear actuator coupled between two rings, including at least one linear actuator connector, mechanically and/or electrically connectable to said at least one linear actuator; a control circuitry, wherein said control circuitry measures a value related to the movement of said at least one linear actuator and/or to the distance or change in distance between said two rings, by receiving signals from said linear actuator connector; and a memory, wherein said memory stores said value.

The aforementioned invention relates to electrical circuitry that can store the necessary correction program in its memory and execute the correction by controlling the linear actuators whereas the proposed invention has a hand-held motorised driver or cannulated motorised custom struts that are controlled by a computer or a mobile data processor such as mobile phone via a power supply unit.

SUMMARY

Custom struts for hexapod bone external fixators can be assembled by the user i.e., the Surgeon, using two separate portions, an externally threaded rod portion and a hollow cylindrical body portion that has a length-adjustment mechanism rotatably coupled to one end.

The threaded rod portion of the strut is a rod with threads on its external surface, same as the commonly used threaded rod in conventional ring fixators such as Ilizarov ring fixators. Other than having threads on its external surface, the threaded rod portion is not configured or modified in any way to provide anchoring points for irreversibly coupling with any other element during manufacture in the factory. This enables the Surgeon to assemble the custom strut by simply connecting the threaded rod of appropriate length to the cylindrical body portion such that the external threads of the threaded rod mate with the internal threads of the threaded bore of the length-adjustment mechanism of the cylindrical body. Surgeon can use the stopper mechanism inside the cylindrical body to grip the end of the threaded rod so that the threaded rod will not inadvertently come out of the cylindrical body. The stopper mechanism also indicates the position of the end of threaded rod in relation to the cylindrical body.

Custom strut can be attached by the Surgeon to the ring of an external fixator using a separate connection element, the strut connector, which has a circular aperture to provide attachment to either end of the custom strut. The Surgeon can insert the threaded rod end of the custom strut into the circular aperture of the strut connector and secure it with two nuts, one above and one below the circular aperture. The Surgeon can insert the partially threaded post at the other end of the custom strut into the circular aperture of another strut connector and secure it with a nylon-insert lock nut so that the strut can rotate about its longitudinal axis.

The joints that are necessary to provide three degrees of rotational freedom for the strut are neither cardan type universal joints nor ball and socket joints irreversibly coupled to the two ends of the strut during its manufacture in the factory. Instead, the circular aperture into which the Surgeon can insert either the threaded rod end or the partially threaded post end of the custom strut is incorporated in a pivoting and rotating holder that provides three degrees of rotational freedom within the strut connector.

The pivoting and rotating holder that provides three degrees of rotational freedom within the strut connector does so by enabling the rotation of the struts and threaded rods about three orthogonal axes: 1) The pivoting axis of the two hinge joints of the pivoting and rotating holder, 2) The axis of rotation of the rotating clamp of the pivoting and rotating holder 3) The longitudinal axis of the custom strut and threaded rod which is colinear with the longitudinal axis of the circular aperture in the pivoting and rotating holder. These three orthogonal axes intersect each other at a single coincident point of universal rotation situated at the centre of the circular aperture in the pivoting and rotating holder, which is the point where the Surgeon can attach either end of the custom strut or threaded rod.

Provision of length adjustment and three degrees of rotational freedom for each of the six custom struts of the hexapod external fixator construct, enables six degree of freedom (6 DOF) for the external fixator so that bone segments can be manipulated for fracture reduction or deformity correction. It is possible to reduce three degrees of rotational freedom for each custom strut to two degrees of rotational freedom by locking nylon-insert lock nut to stop the rotational movement of the custom strut around its longitudinal axis, thus providing a stable environment for bone healing during consolidation phase.

The ability to choose a threaded rod of any length to assemble a custom strut at the time of application of external fixator, enables the Surgeon to set up the custom strut such that maximum possible range of excursion for length adjustment of the strut is available to perform the full correction of deformity without the need for change of strut during the course of correction. If the deformity correction program requires a particular strut to be lengthened, the Surgeon can assemble the custom strut in such a way that the end of threaded rod attached to the cylindrical body is near the partially threaded post end of the cylindrical body allowing full range of excursion of the threaded rod within the cylindrical body and maximum possible increase in the overall length of the strut. If the deformity correction program requires a particular strut to be shortened, the Surgeon can assemble the custom strut in such a way that the end of threaded rod attached to the cylindrical body is near the length-adjustment mechanism of the cylindrical body allowing full range of excursion of the threaded rod within the cylindrical body and maximum possible decrease in the overall length of the strut.

The Surgeon can change the threaded rod portion of the strut to that of a different length without having to change the entire strut if the custom strut runs out of range of excursion during the course of correction of a severe deformity that requires large amount of length adjustment.

A modified custom strut with a quick connecting mechanism enables a threaded rod to be connected to it without having to thread it from one end. The split nut of the quick connecting mechanism has two separate arms articulating with the length adjustment mechanism that can open wide enough to allow smooth passage of the threaded rod without making contact with it. When the threaded rod is at the desired position within the modified custom strut, the two arms of the split nut can be closed to mate with the threads of the threaded rod.

When a threaded rod of required length is not available to assemble a custom strut, longer threaded rod can be used in its place and attached to the strut connector in such a way that the excess length of the threaded rod protrudes through the circular aperture of the pivoting and rotating holder, thus preserving the range of excursion available for length adjustment of the strut.

The strut connectors are not integrated with the rings of the external fixator during their manufacture but are supplied separately so that the Surgeon can insert them into any desired holes of the ring of external fixator enabling variable positioning of the custom struts as required by a particular situation.

The two rings of hexapod external fixator are connected with six custom struts in pairs, with one end of each pair attached to a ring via one strut connector and the other end of that pair attached to the other ring via two adjacent strut connectors. In particular situations when the ends of two custom struts belonging to a pair cannot be attached to the same strut connector due to impingement of struts against the limb, the Surgeon can attach them to two separate single strut connectors with a gap between the two.

The opposing surfaces of the strut connector and the ring at the interface between the two are modified so that they can interlock with each other to provide rotational stability for the strut connector.

Quick reduction and re-alignment of the bone segments can be performed by manipulating the rings of the external fixation frame that are connected directly with six threaded rods in hexapod configuration via strut connectors without using bodies of the struts. Quick manipulation of the rings is made possible by the pivoting and rotating holders of the strut connector that provide three degrees of rotational freedom for each threaded rod.

Patients can be given a hand-held motorised driver that can be connected to a power supply unit, which is controlled by connecting it to a computer or any mobile digital processor such as mobile phone, that can be programmed to execute the appropriate amount of length adjustment of each of the six custom struts of the hexapod external fixator, as per the daily schedule of correction prepared by the Surgeon.

Surgeon can construct the hexapod external fixator with six motorised custom struts connected to a power supply unit, which is controlled by connecting it to a computer or any mobile digital processor such as mobile phone, that can be programmed to execute the appropriate amount of length adjustment of each of the six motorised custom struts as per the daily schedule of correction prepared by the Surgeon. The cannulated motor incorporated—within the body of motorised custom strut enables the Surgeon to attach a threaded rod of chosen length to preserve optimum range of excursion of the threaded rod within the cannulated motor, minimising the need for strut change during the correction of deformity. Using cannulated motors incorporated within the body of the custom struts instead of using separate motors mounted on custom struts, significantly reduces the overall bulk of the hexapod external fixator.

The present disclosure provides an external bone fixation system comprising a first platform which is a ring around the limb holding a segment of bone, a second platform which is another ring around the limb holding another segment of bone, interconnected with six length-adjustable telescoping custom-assembled struts using connecting elements in the form of strut connectors consisting of pivoting and rotating holders that allow three degrees of rotational freedom for each strut.

Each telescoping strut comprises of two separate portions, an externally threaded rod portion and a hollow cylindrical body portion with integrated length-adjustment mechanism. The length-adjustment mechanism is essentially a nut modified into a wheel rotatably coupled to one end of the cylindrical body portion of the strut and has an internally threaded bore. The custom strut can be assembled by the user, i.e., the Surgeon, by connecting the two portions so that the external threads of the rod portion mate with the internal threads of the threaded bore of the rotating wheel of length-adjustment mechanism of the cylindrical body portion such that rotating the wheel would cause the threaded rod to translate and effect a change in overall length of the strut. A stopper mechanism gripping the end of the threaded rod inside the cylindrical body stops the threaded rod from inadvertently coming out of the cylindrical body and also indicates the position of the end of threaded rod in relation to the cylindrical body. The threaded rod portion of the strut is a simple rod with threads on its external surface similar to the threaded rods commonly used in the conventional Ilizarov ring external fixators. The threaded rods are not configured or modified in any way to provide anchoring points in order to irreversibly couple them, during their manufacture in the factory, to the first or second platforms, i.e., the rings. Instead, the Surgeon is able to reversibly attach the threaded rod to the ring using a connecting element, the strut connector that has a pivoting and rotating holder with a circular aperture for inserting the threaded rod and securing it with two nuts, one above and one below the holder. Similarly, the Surgeon can reversibly attach the cylindrical body to the ring via strut connector by inserting a partially threaded post present at the other end of cylindrical body into the circular aperture of the pivoting and rotating holder of the strut connector and securing it with a nylon-insert lock nut so that the strut can rotate about its longitudinal axis enabling three degrees of rotational freedom for the strut. Thus, the Surgeon can assemble a custom strut of any given length by connecting a simple, unmodified, commonly used threaded rod of required length and attaching its one end to the cylindrical body of standard length and the other end to the ring via strut connector. Therefore, the operating theatre inventory does not have to stock factory-assembled struts of various lengths but instead, it needs to stock cylindrical bodies of standard length and threaded rods of various lengths that are commonly part of an inventory of any conventional ring external fixator system.

When assembling the custom strut, the Surgeon is able to choose a threaded rod of optimum length so that there is maximum possible range available for the threaded rod for excursion within the cylindrical body of the strut enabling maximum amount of length adjustment during the course of deformity correction. For example, if the deformity correction program requires a particular strut to be lengthened during the course of correction, the Surgeon can assemble the custom strut in such a way that the end of threaded rod attached to the cylindrical body is near the partially threaded post end of the cylindrical body allowing full range of excursion of the threaded rod within the cylindrical body and maximum possible increase in overall length of the strut. Similarly, if the deformity correction program requires a particular strut to be shortened during the course of correction, the Surgeon can assemble the custom strut in such a way that the end of threaded rod attached to the cylindrical body is near the rotating wheel end of the cylindrical body allowing full range of excursion of the threaded rod within the cylindrical body and maximum possible decrease in overall length of the strut. Therefore, it is likely that the range of excursion available in each custom strut is sufficient to effect the full amount of length adjustment needed for correction of any particular deformity. On some occasions during the correction of severe deformities requiring large amount of length adjustment, the custom strut may run out of range of excursion in which case, the threaded rod portion of the strut can be simply changed to a different length without having to change the entire strut. Therefore, the out-patient clinic inventory needs to hold only the threaded rods of various lengths in stock, not the pre-assembled struts or cylindrical bodies of the struts. When a threaded rod of required length is not available to assemble a custom strut, longer threaded rod can be used in its place and attached to the strut connector in such a way that the excess length of the threaded rod protrudes through the circular aperture of the rotating-pivoting holder, thus preserving the range of excursion available for the length adjustment of the strut. A modified custom strut with a quick connecting mechanism enables a threaded rod to be connected to it without having to thread it from one end.

Strut connectors connecting the custom struts or the threaded rods to the rings have integrated pivoting and rotating holders that allow three degree of rotational freedom for each custom strut and threaded rod by enabling their rotation about three orthogonal axes that intersect each other at a single coincident point of universal rotation. This single coincident point of universal rotation lies at the midpoint of the circular aperture of the integrated pivoting and rotating holder where the Surgeon can attach the strut or the threaded rod. As a result, the hexapod construct with six custom struts whose length can be adjusted, has six degree of freedom (6 DOF) so that bone segments can be manipulated for fracture reduction or deformity correction. During the consolidation phase of bone healing, three degree of rotational freedom for each custom strut can be reduced to two degree of rotational freedom by locking the custom strut at the strut connector, thus providing a stable environment for bone healing.

The custom struts are attached to the rings using strut connectors that are not integrated with the rings during the manufacture in the factory but are supplied separately. This allows the Surgeons to attach the strut connector to any desired hole in the ring enabling variable position attachment of struts to the rings to avoid strut impingement against a deformed limb. Occasionally quick manipulation rather than gradual manipulation of the limb may be required, especially when a fracture needs to be reduced back into position. In such cases it may be possible to connect the two rings directly with six threaded rods via strut connectors at either end of the threaded rods without the need for cylindrical bodies for the struts. The strut connectors with their pivoting and rotating holders allow three degrees of rotational freedom for each threaded rod enabling quick manipulation of the hexapod external fixator.

If some patients are not able to perform daily length adjustment of custom struts, they can be given a hand-held motorised driver connected to a power supply unit, which is controlled by connecting it to a computer or any mobile digital processor such as mobile phone, that can be programmed to execute the appropriate amount of length adjustment of each of the six custom struts of the hexapod external fixator, as per the daily schedule of correction prepared by the Surgeon. If any of the patients are unable to operate the hand-held motorised driver, the Surgeon can construct the hexapod external fixator with six motorised custom struts connected to a power supply unit, which is controlled by connecting it to a computer or any mobile digital processor such as mobile phone, that can be programmed to execute the appropriate amount of length adjustment of each of the six motorised custom struts as per the daily schedule of correction prepared by the Surgeon. The cannulated motor incorporated within the body of motorised custom strut enables the Surgeon to attach a threaded rod of chosen length to preserve optimum range of excursion of the threaded rod within the cannulated motor, minimising the need for strut change during the correction of deformity. Using cannulated motors incorporated within the body of the custom struts rather than using separate motors mounted on custom struts, significantly reduces the overall bulk of the hexapod external fixator.

The user i.e., the Surgeon, is able to assemble custom struts of hexapod external fixator in such a way that for any given situation, maximum possible range of excursion for length adjustment of the strut is available to perform the full correction of deformity without the need for strut change during the course of correction.

The Surgeon can re-assemble the custom strut by changing only the threaded rod portion of the strut rather than changing the entire strut when it runs out of range of excursion during the course of correction of severe deformity requiring large amount of length adjustment.

A threaded rod can be connected to a modified custom strut, without having to thread it from one end, by using the quick connecting mechanism of the modified custom strut that allows free, smooth movement of the threaded rod to the desirable position within the custom strut.

The Surgeon can attach the custom strut or the threaded rod to the ring of external fixator using a connection element that provides three degrees of rotational freedom for the strut and threaded rod by enabling their rotation about three orthogonal axes that intersect at a single coincident point of universal rotation. This single coincident point of universal rotation is the point at which the Surgeon can attach the custom strut or the threaded rod to the connecting element.

The degree of rotational freedom for each strut is reduced by locking the custom strut at its attachment to the ring after correction of deformity, thus providing a stable environment for bone healing during consolidation phase.

The Surgeon can attach the custom strut to any desired hole of the ring of external fixator allowing variable positioning of custom struts to avoid impingement of the strut against the limb.

A quick reduction and realignment of the bone segments is provided by manipulating the rings of the external fixator connected directly with threaded rods in hexapod configuration without using bodies of the struts.

Patients can perform daily length adjustment of custom struts using a hand-held motorised driver connected to a power supply unit, which is controlled by connecting it to a computer or any mobile digital processor such as mobile phone, that can be programmed to execute the appropriate amount of length adjustment of each of the six custom struts of the hexapod external fixator, as per the daily schedule of correction prepared by the Surgeon.

Patients who are unable to perform daily length adjustment of struts can be provided with cannulated motors incorporated into the custom struts connected to a power supply unit, which is controlled by connecting it to a computer or any mobile digital processor such as mobile phone, that can be programmed to execute the appropriate amount of length adjustment of each of the six motorised custom struts as per the daily schedule of correction prepared by the Surgeon.

The bulk of the hexapod fixator is minimized by incorporating cannulated motors within the body of the custom struts rather than using separate motors mounted on custom struts that may increase the overall bulk of the hexapod external fixator.

DETAILED DESCRIPTION

Figure 1:
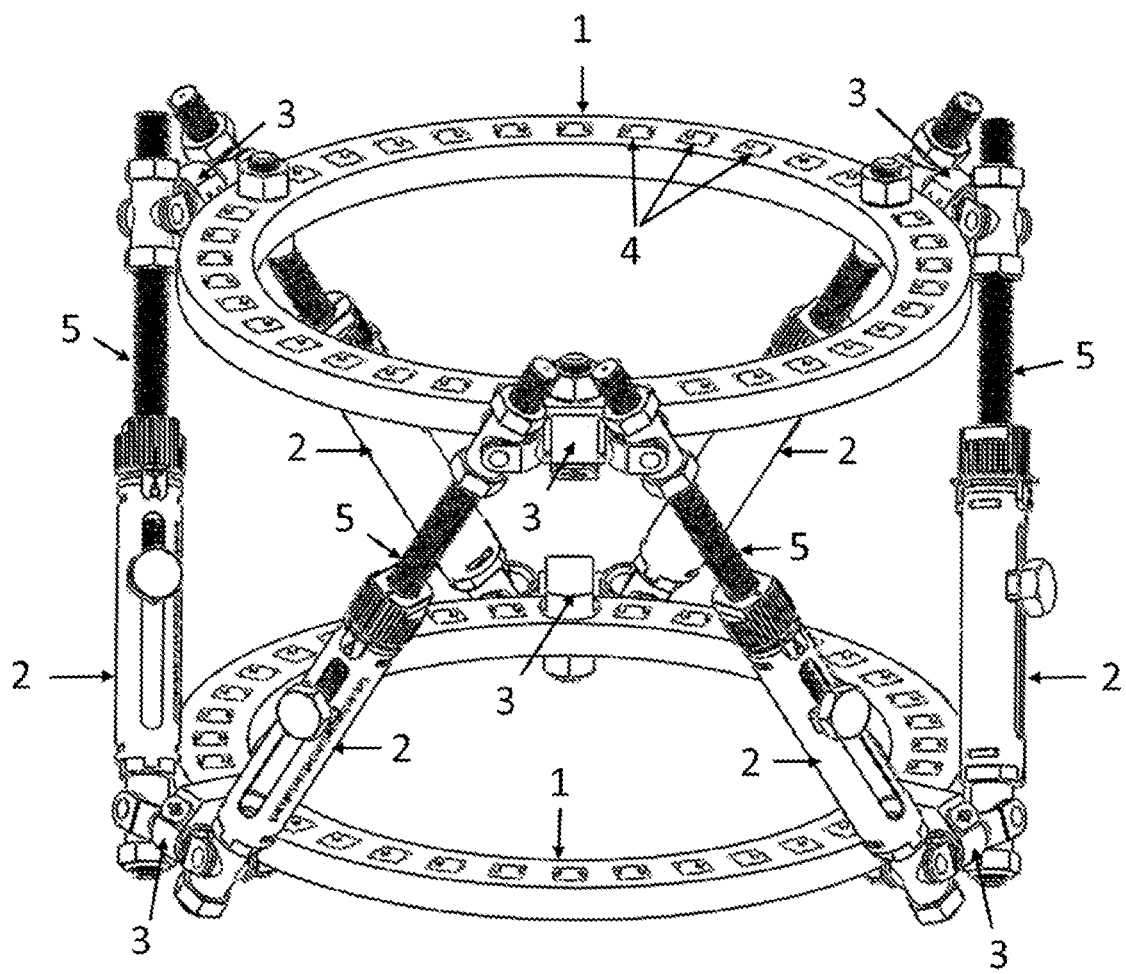
FIG. 1: shows an external fixator construct with two rings connected with six custom struts in hexapod configuration.
Figure 2:
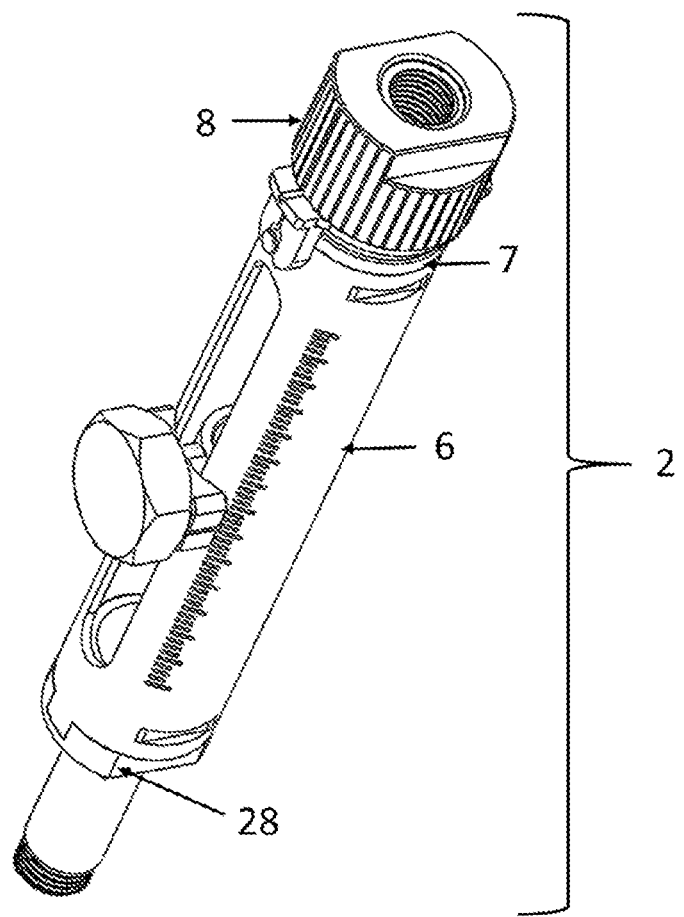
FIG. 2: shows a custom strut assembly.
Figure 3:
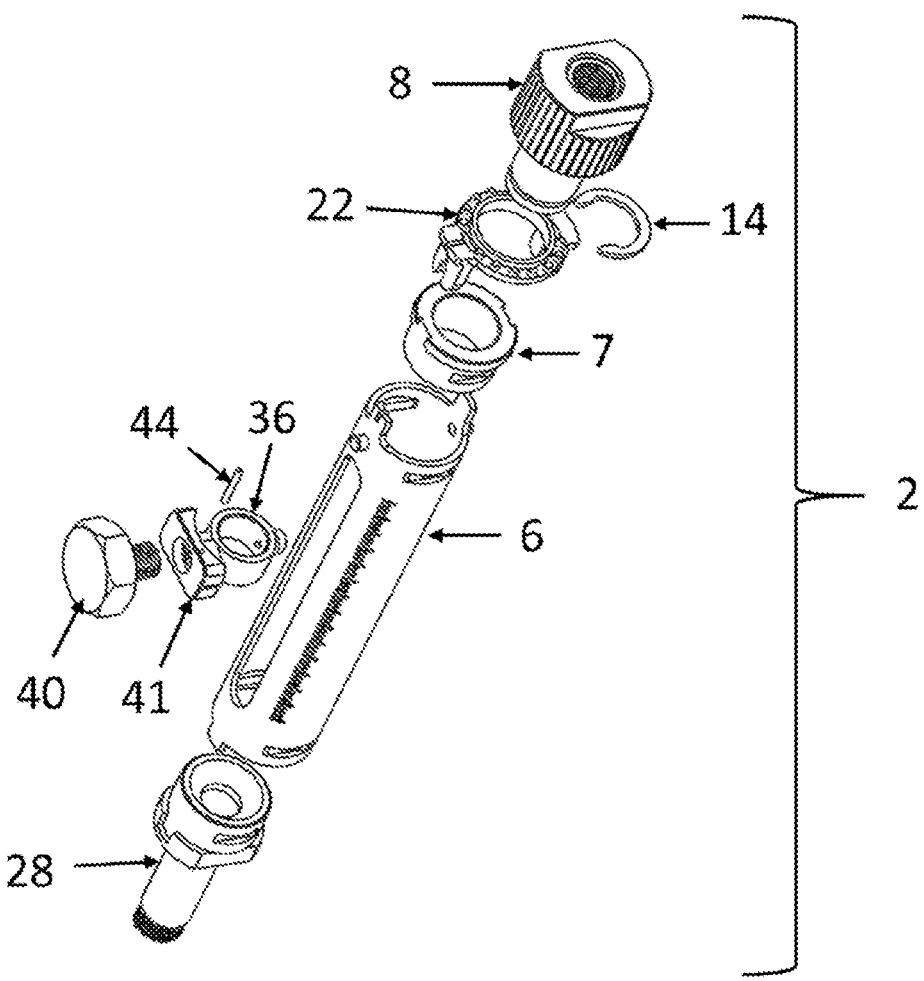
FIG. 3: shows an exploded view of custom strut.
Figure 4:
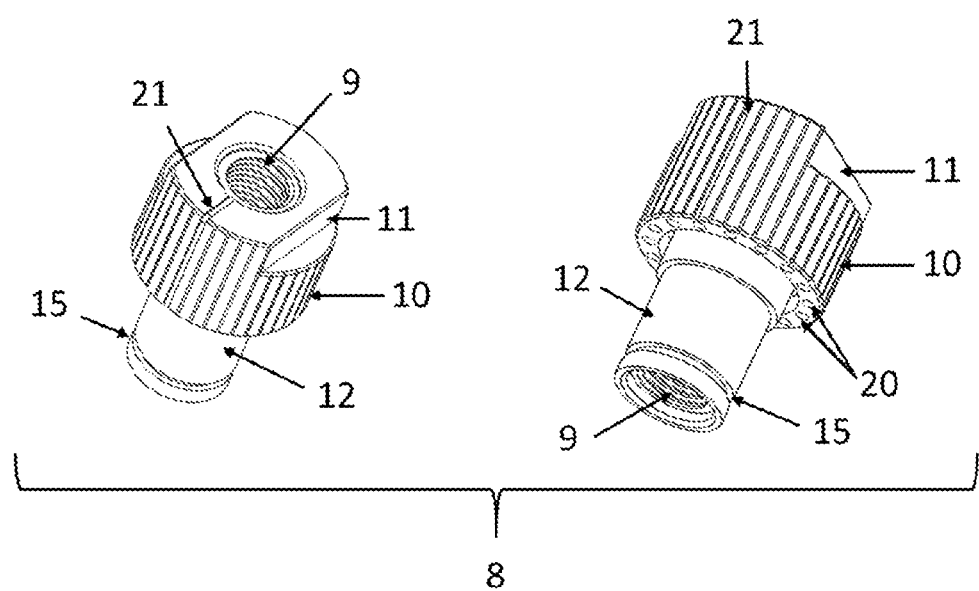
FIG. 4: shows top and bottom views of the rotatable actuator wheel.
Figure 5:
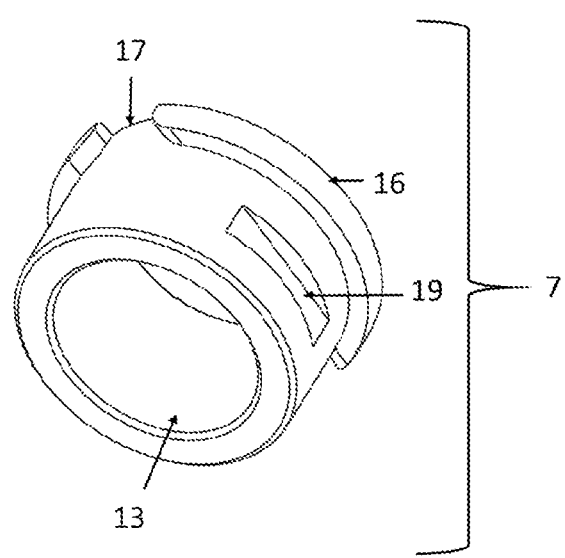
FIG. 5: shows the bushing.
Figure 6:
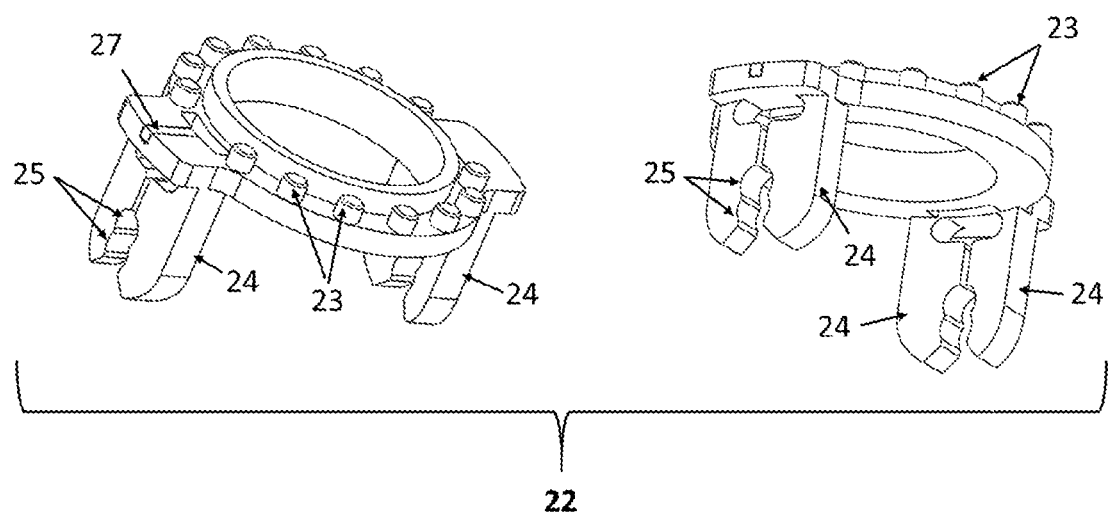
FIG. 6: shows top and bottom views of the locking slider.
Figure 7:
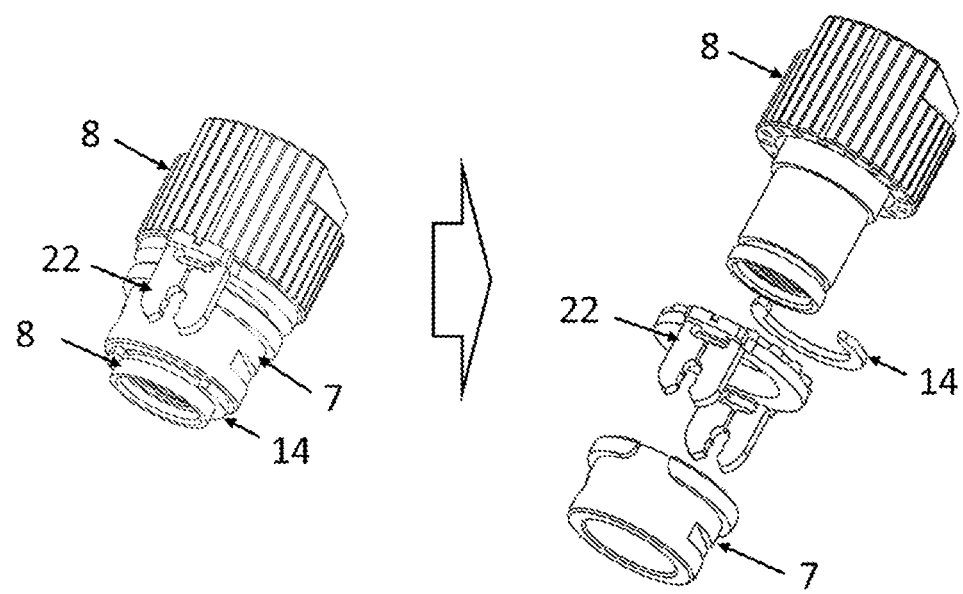
FIG. 7: shows a rotatable actuator wheel mechanism assembly and exploded view.
Figure 8:
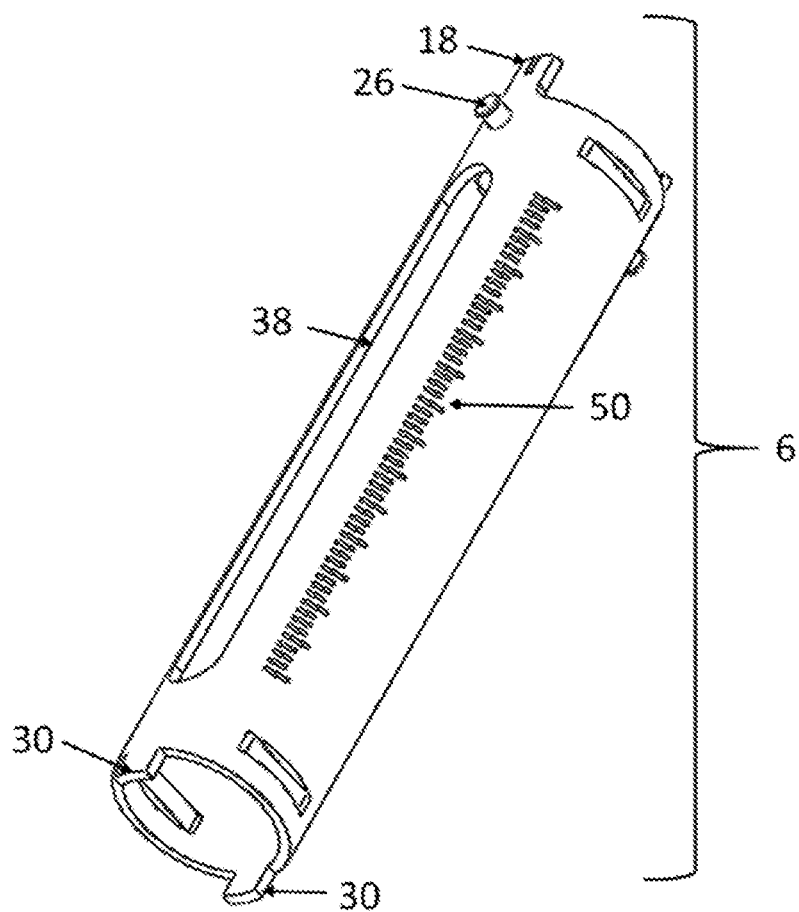
FIG. 8: shows a cylindrical body of custom strut.
Figure 9:
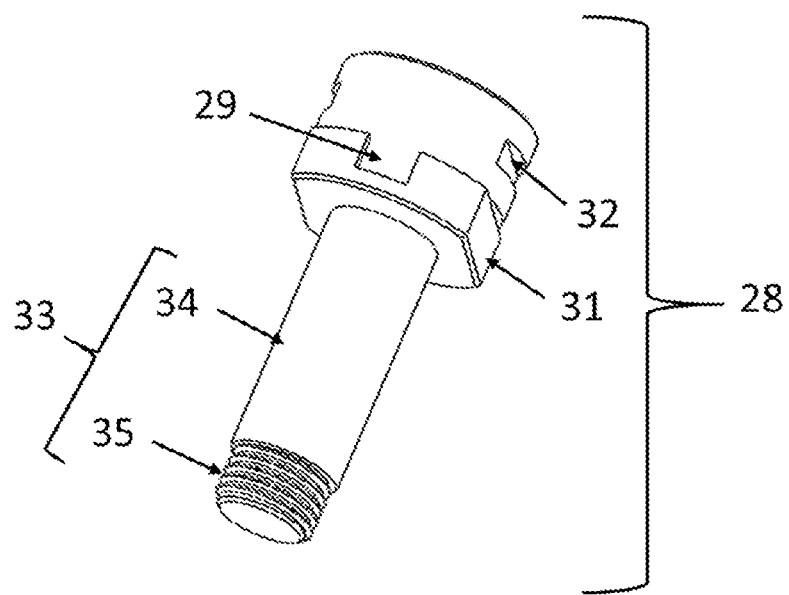
FIG. 9: shows a platform at the bottom of custom strut.
Figure 10:
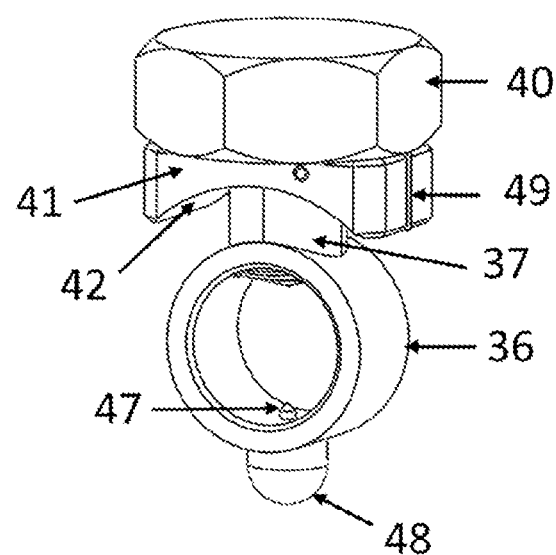
FIG. 10: shows an end stopper assembly.
Figure 11:
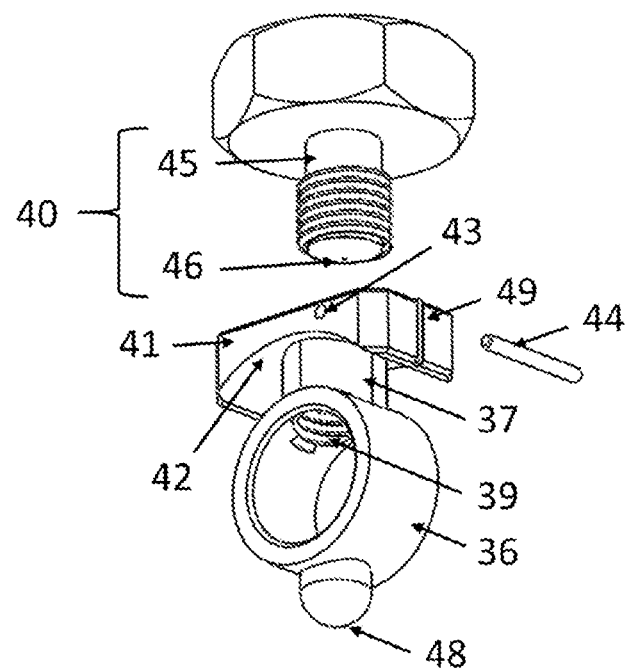
FIG. 11: shows an exploded view of the end stopper.
Figure 12:
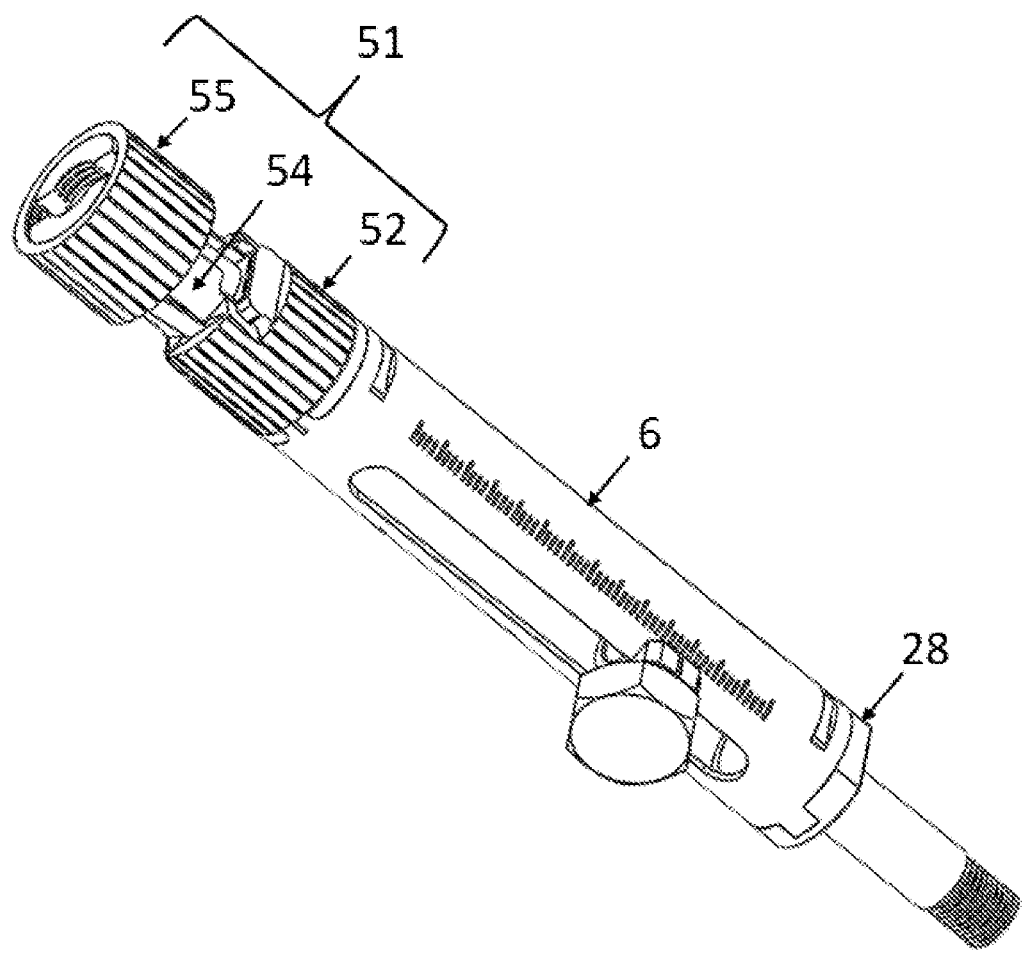
FIG. 12: shows a custom strut with quick connect mechanism.
Figure 13:
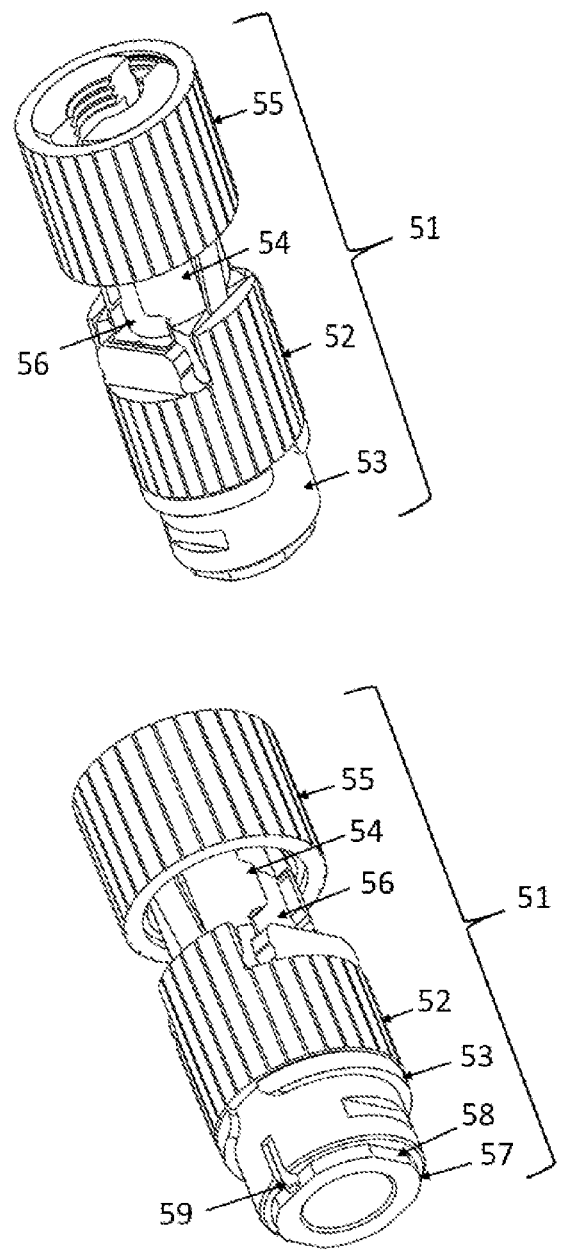
FIG. 13: shows top and bottom views of quick connect mechanism.
Figure 14:
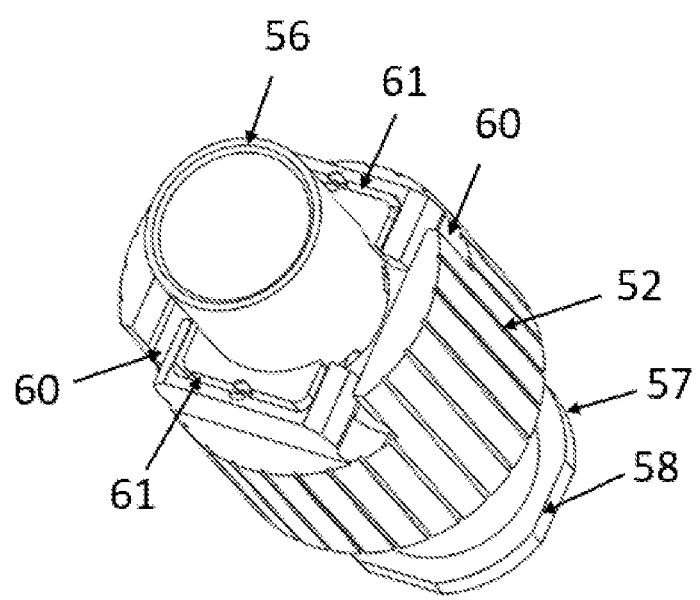
FIG. 14: shows a modified rotatable actuator wheel coupled to hollow tube.
Figure 15:
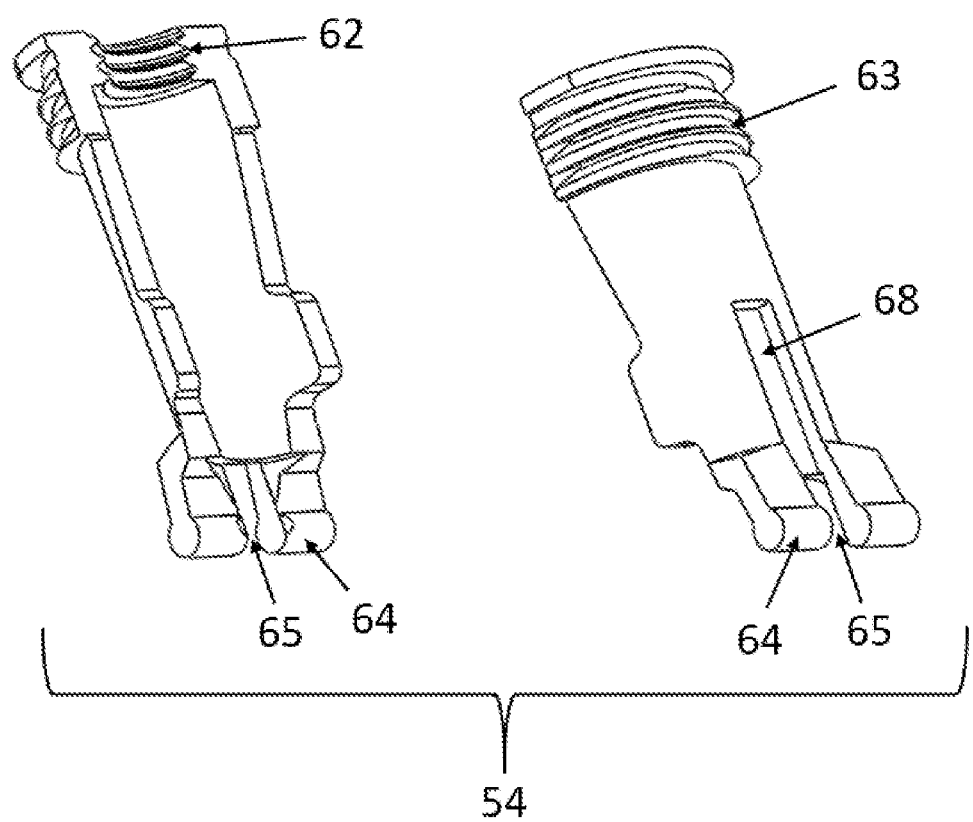
FIG. 15: shows inner and outer surface views of arms of split nut.
Figure 16:
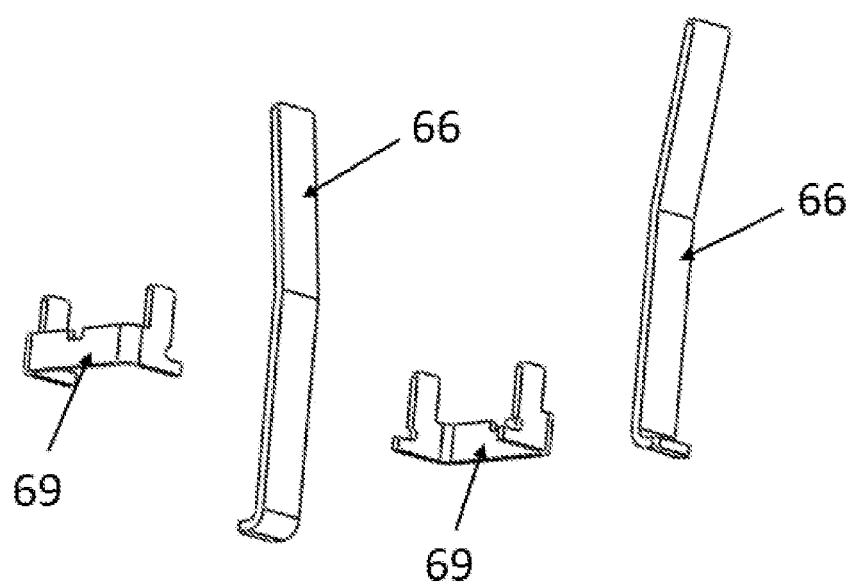
FIG. 16: shows inner and outer surface views of long leaf spring and dual arm leaf spring.
Figure 17:
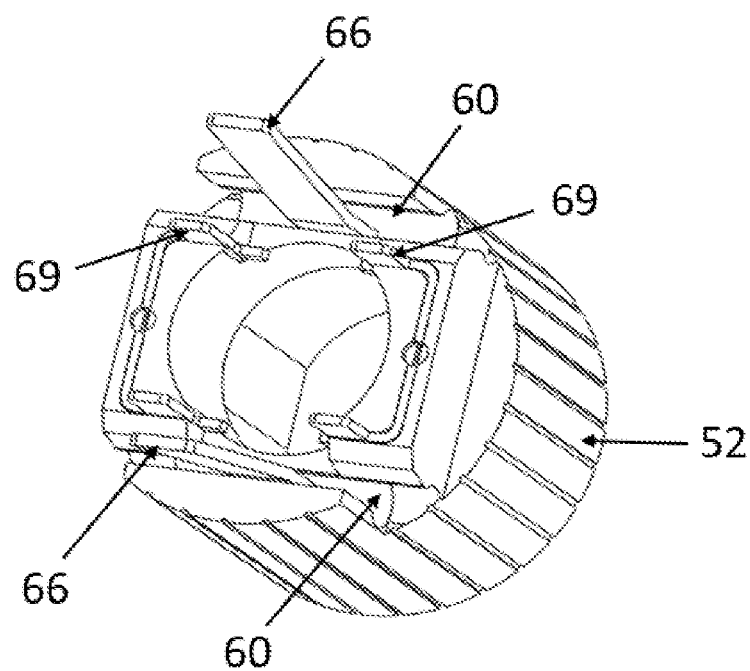
FIG. 17: shows long leaf springs and dual arm leaf springs mounted on modified rotatable actuator wheel.
Figure 18:
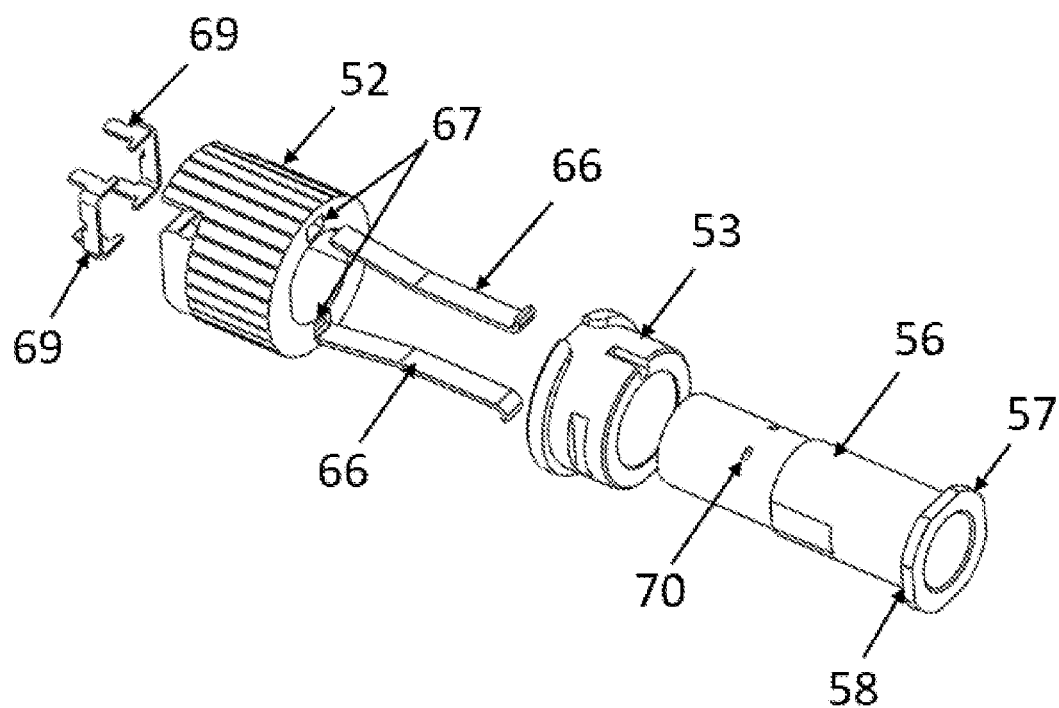
FIG. 18: shows an exploded view of hollow tube, modified rotatable actuator wheel, long leaf springs and dual arm springs.
Figure 19:
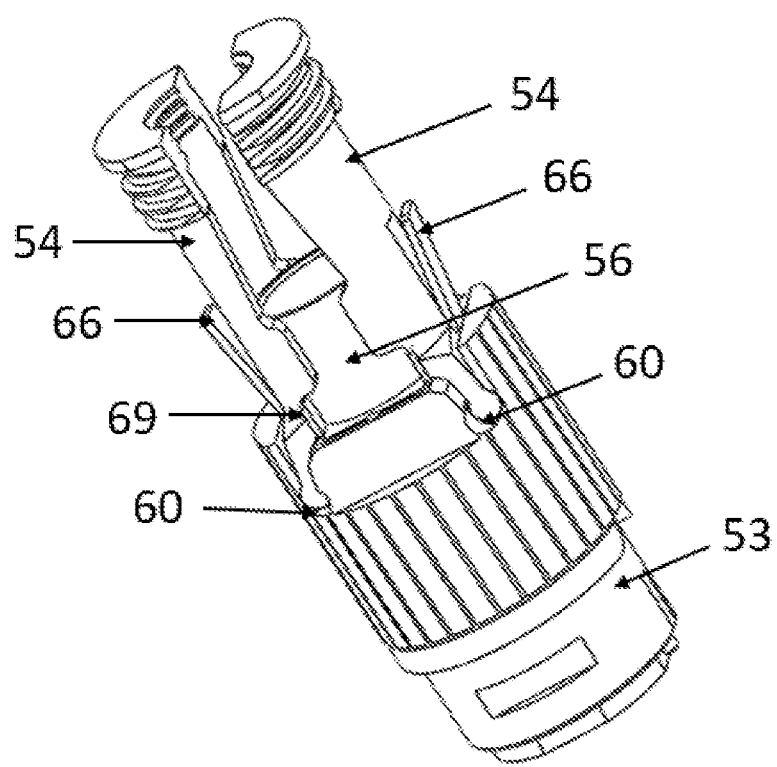
FIG. 19: shows articulation between two arms of split nut and modified rotatable actuator wheel.
Figure 20:
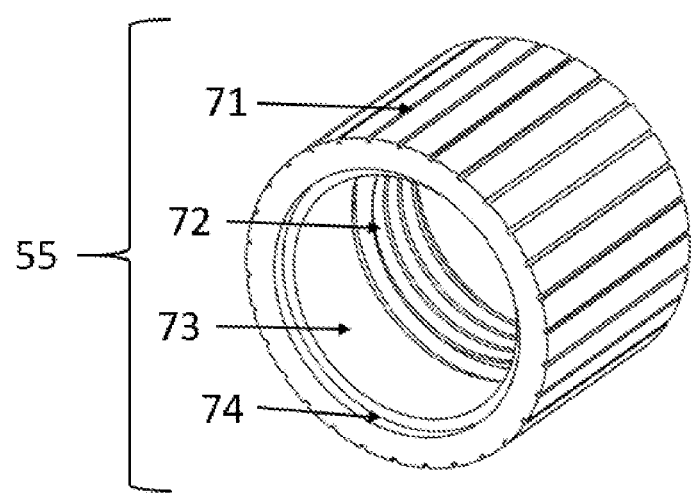
FIG. 20: shows a locking barrel.
Figure 21:
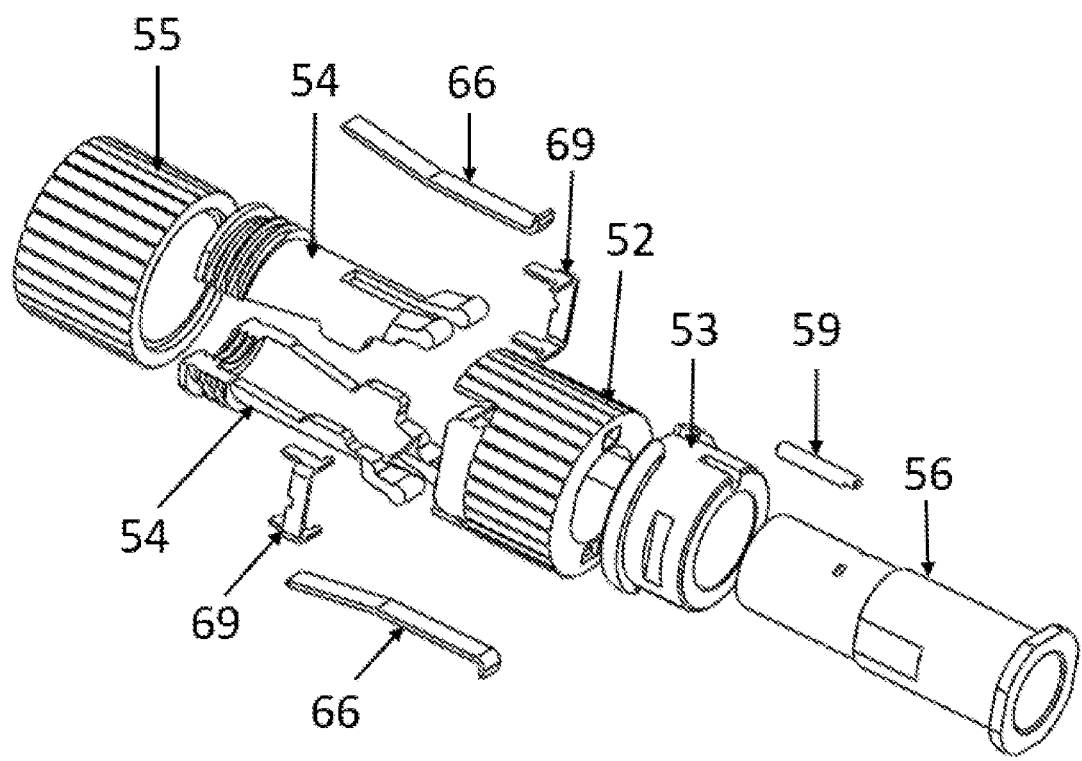
FIG. 21: shows an exploded view of quick connect mechanism.
Figure 22:
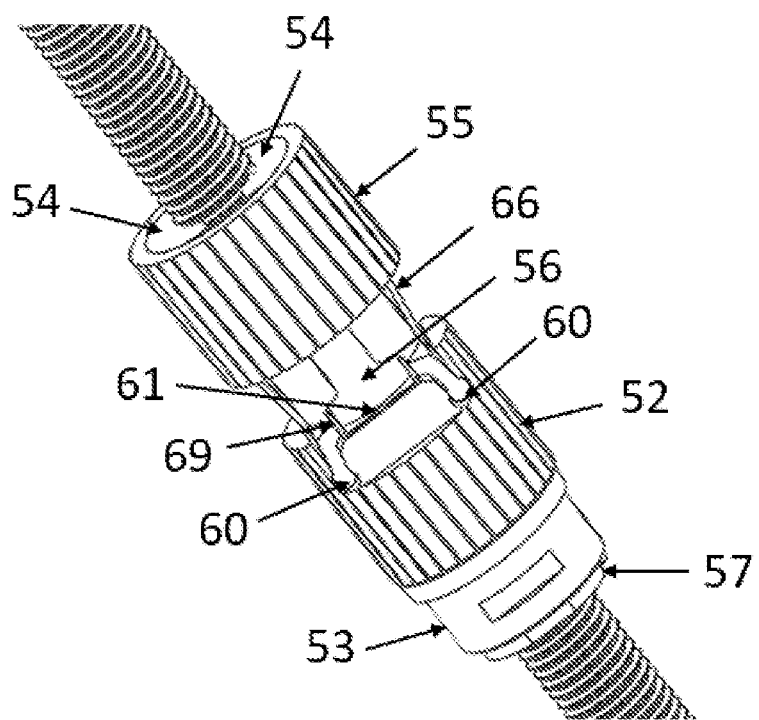
FIG. 22: shows a quick connect mechanism holding a threaded rod with locking barrel in locked position.
Figure 23:
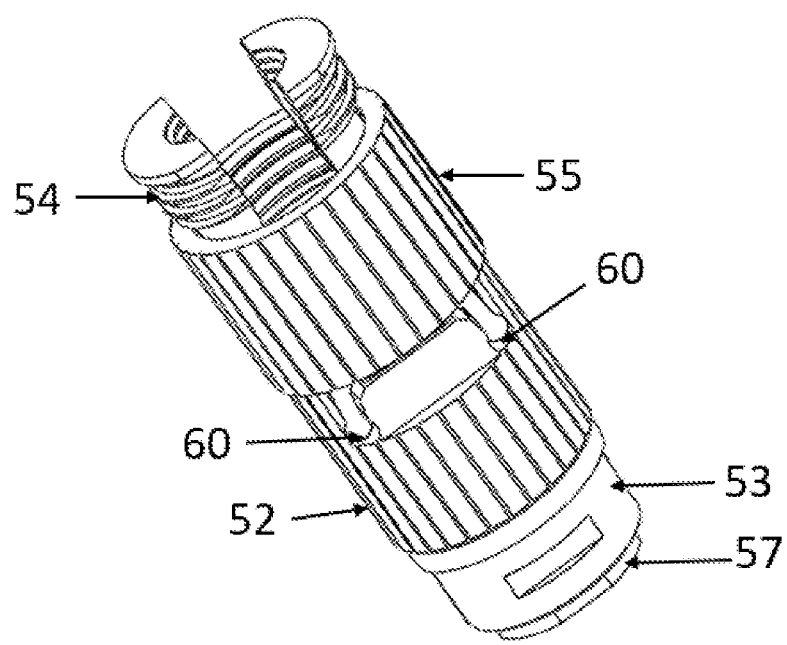
FIG. 23: shows a quick connect mechanism with locking barrel in unlocked position.
Figure 24:
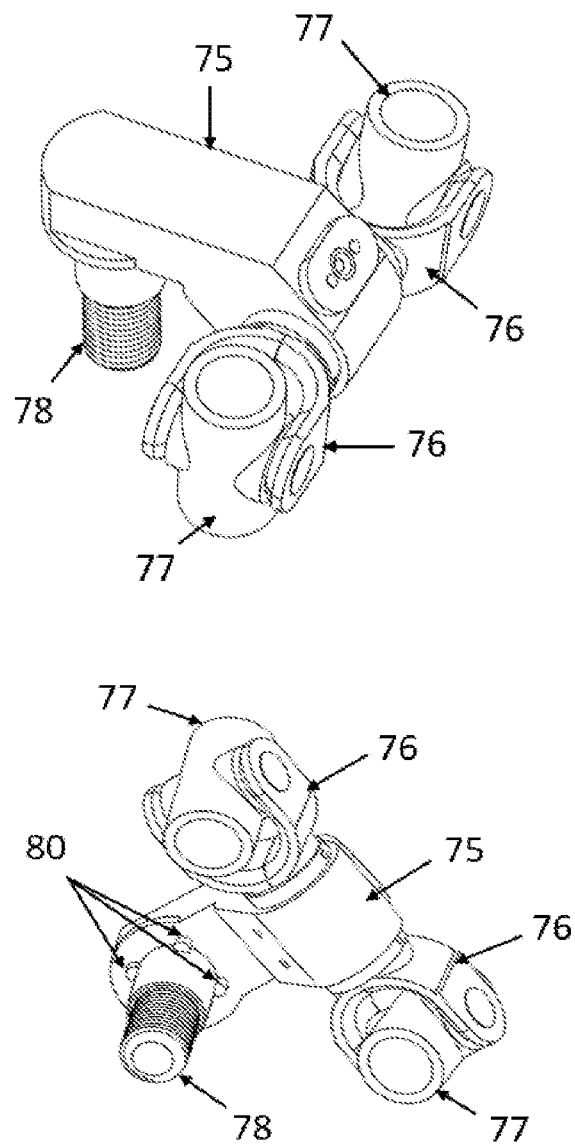
FIG. 24: shows top and bottom views of strut connector.
Figure 25:
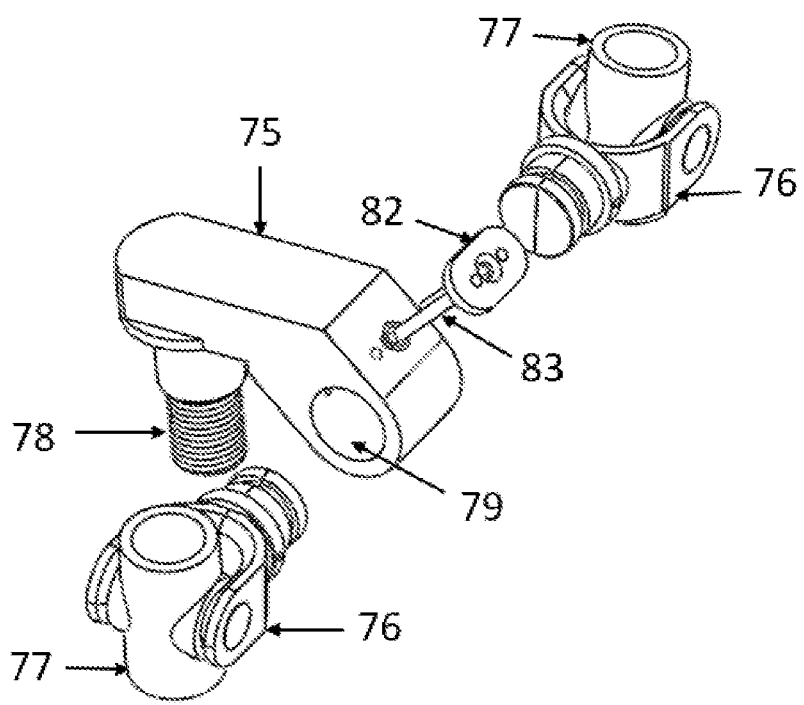
FIG. 25: shows an exploded view of strut connector.
Figure 26:
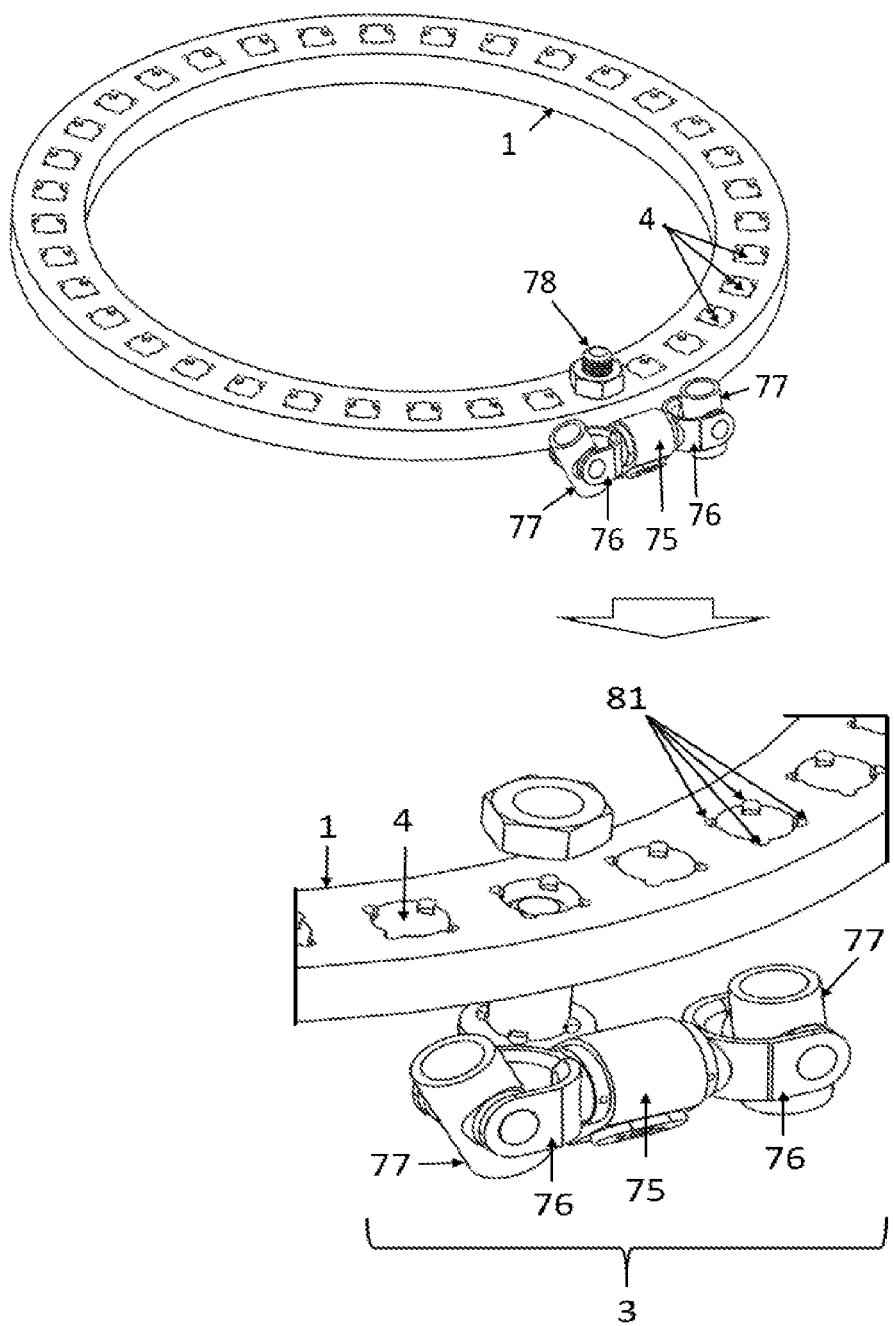
FIG. 26: shows a strut connector mounted on a ring. Inset shows details of the holes in the ring.
Figure 27:
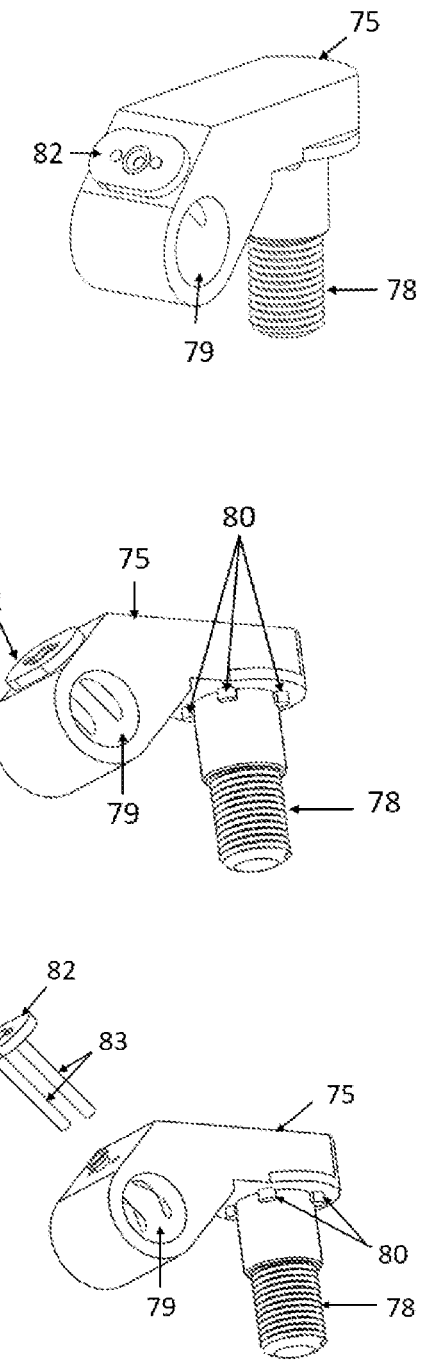
FIG. 27: shows top, bottom and exploded views of the body of the strut connector.
Figure 28:
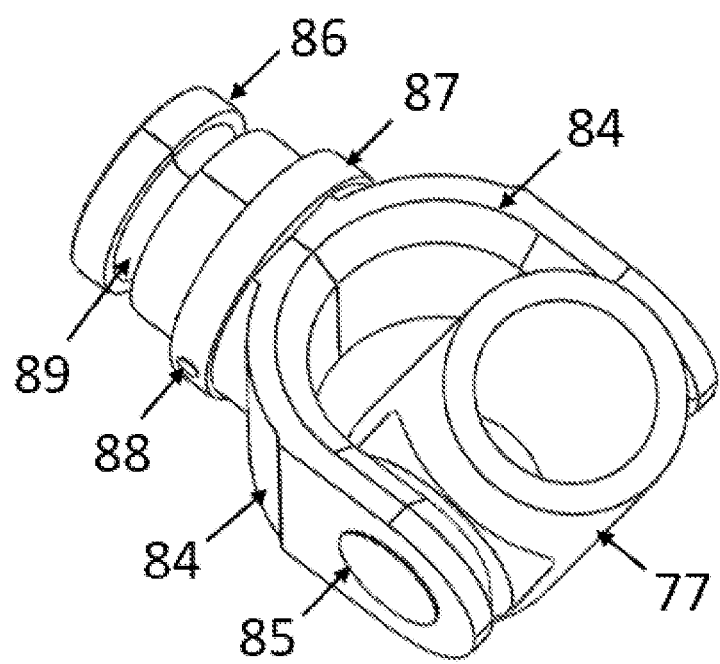
FIG. 28: shows a rotating clamp and pivoting ring-shaped holder assembly.
Figure 29:
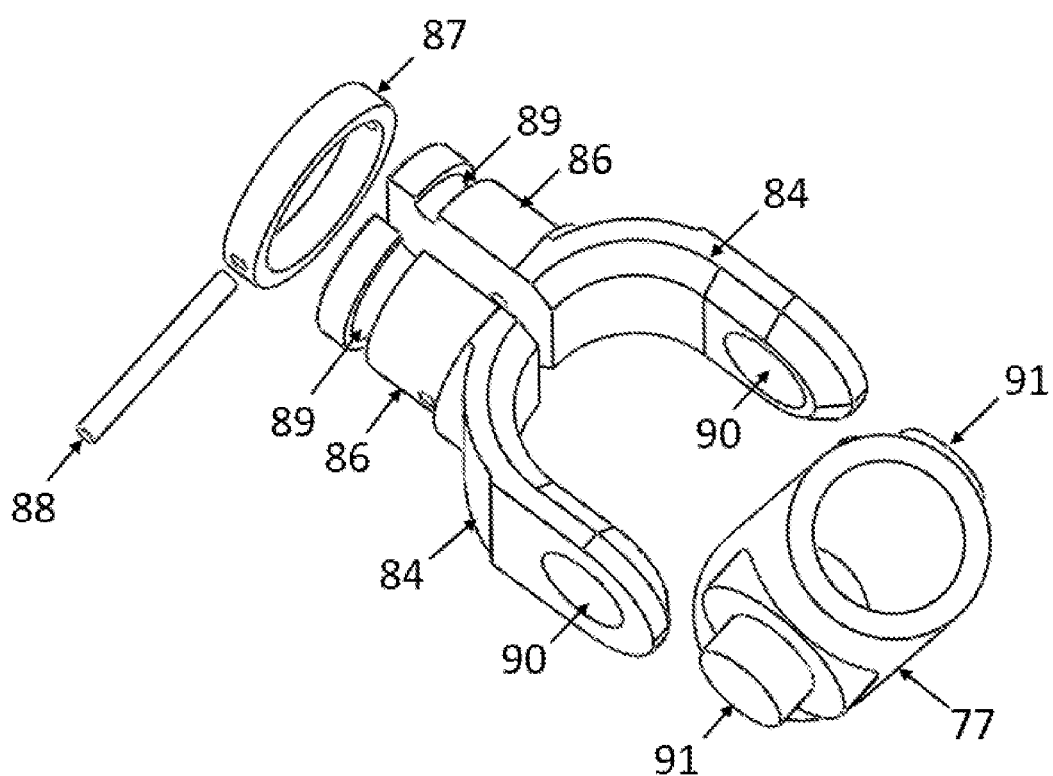
FIG. 29: shows an exploded view of rotating clamp and pivoting ring-shaped holder.
Figure 30:
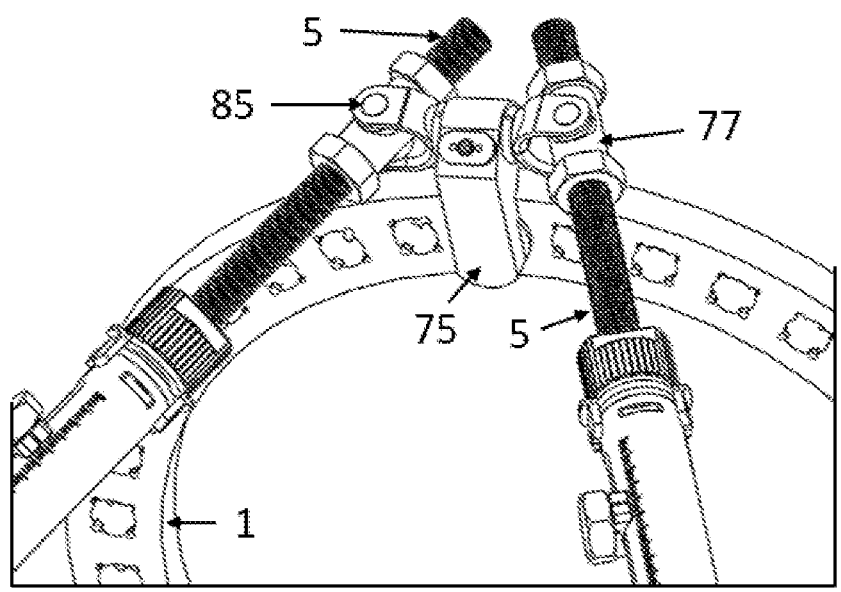
FIG. 30: shows a threaded rod from custom strut attached to strut connector mounted on a ring. Inset shows details of the connection
Figure 30:
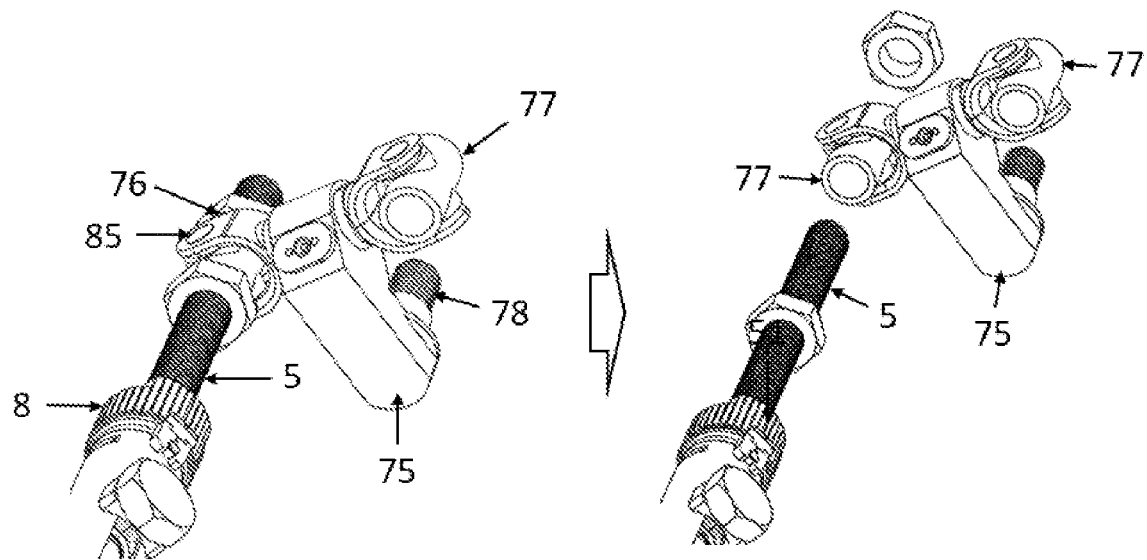
Figure 31:
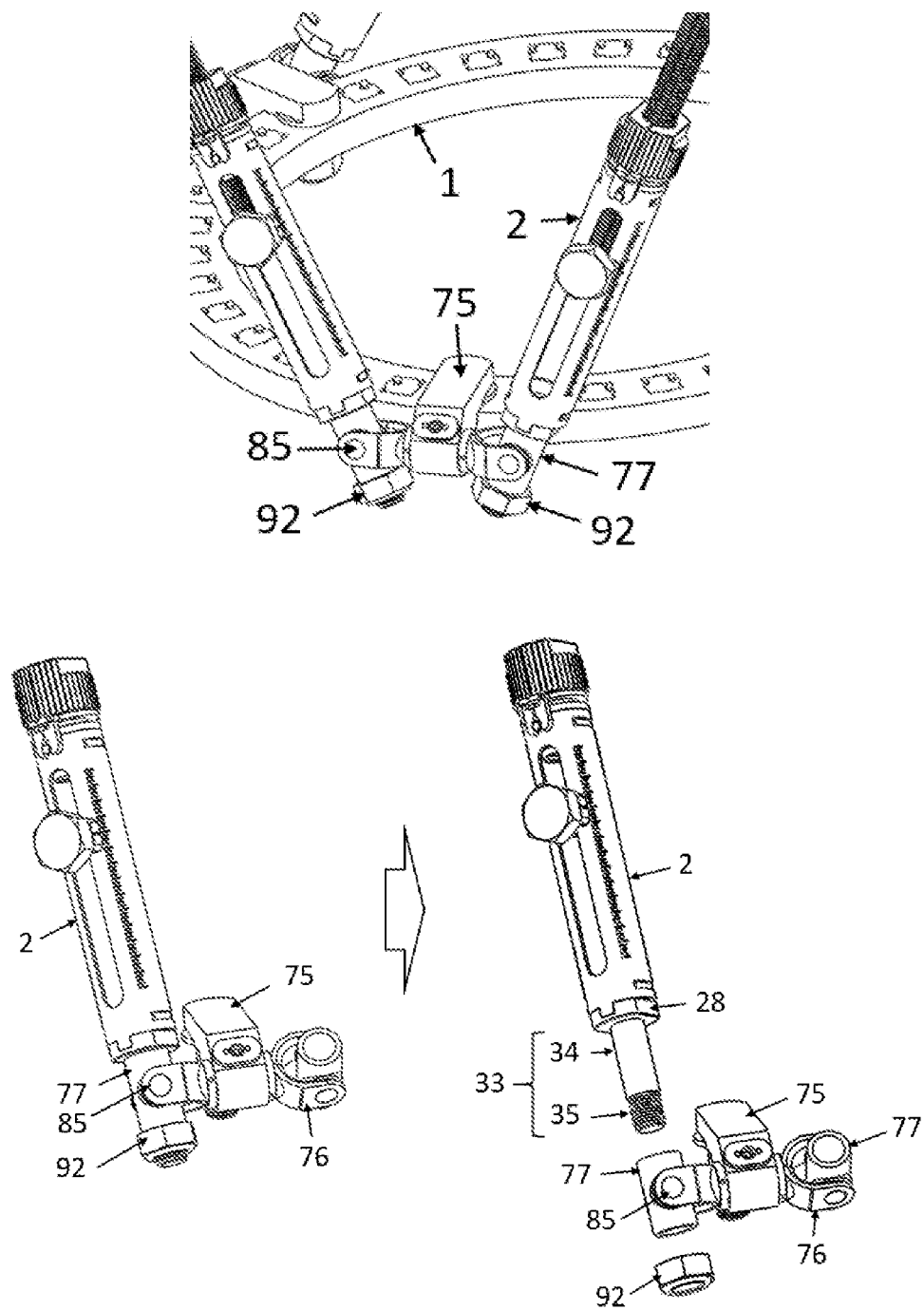
FIG. 31: shows a partially threaded post of the custom strut attached to strut connector mounted on a ring. Inset shows details of the connection.
Figure 32:
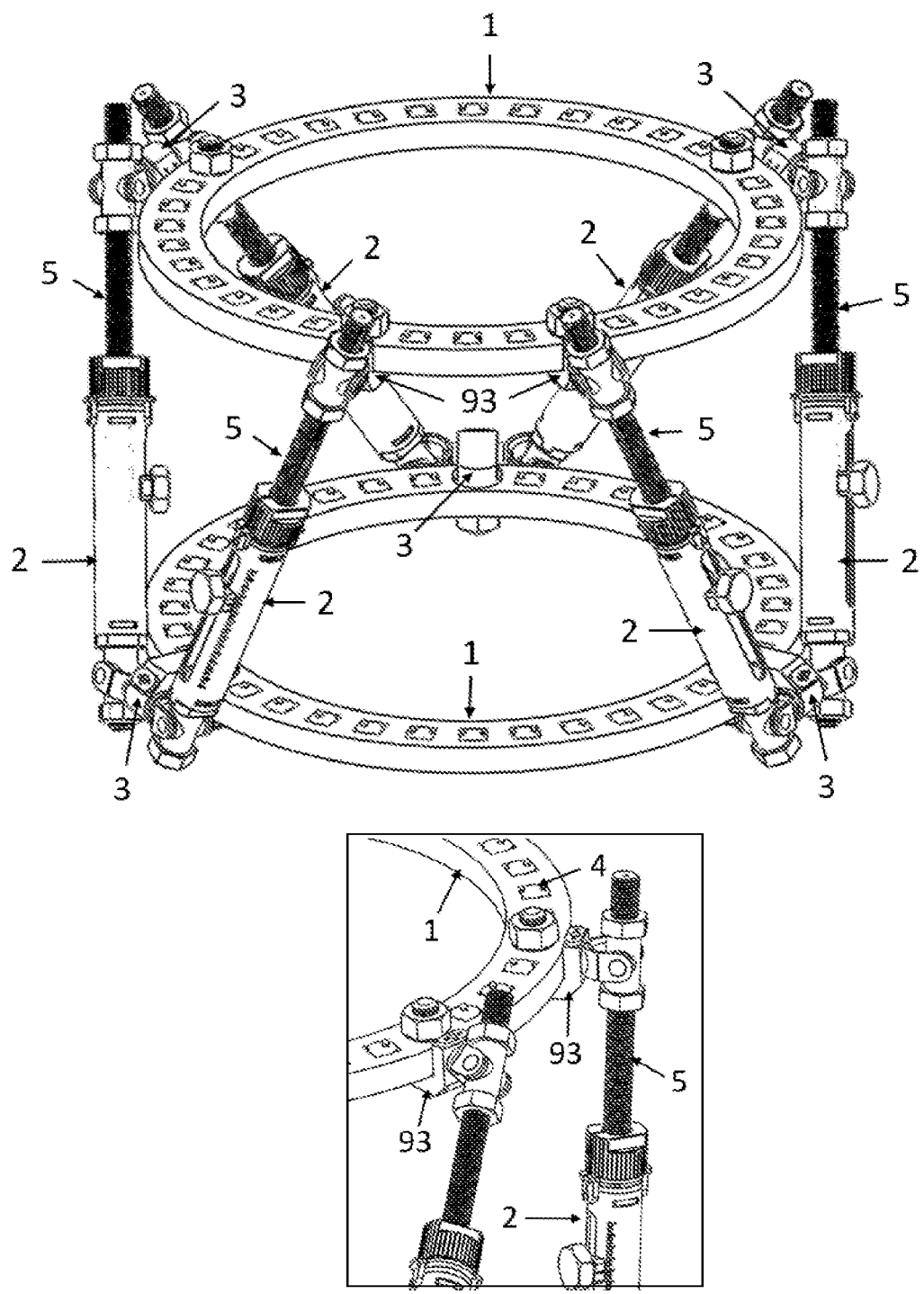
FIG. 32: shows an external fixator construct in hexapod configuration using single strut connectors. Inset shows details of the connection.
Figure 33:
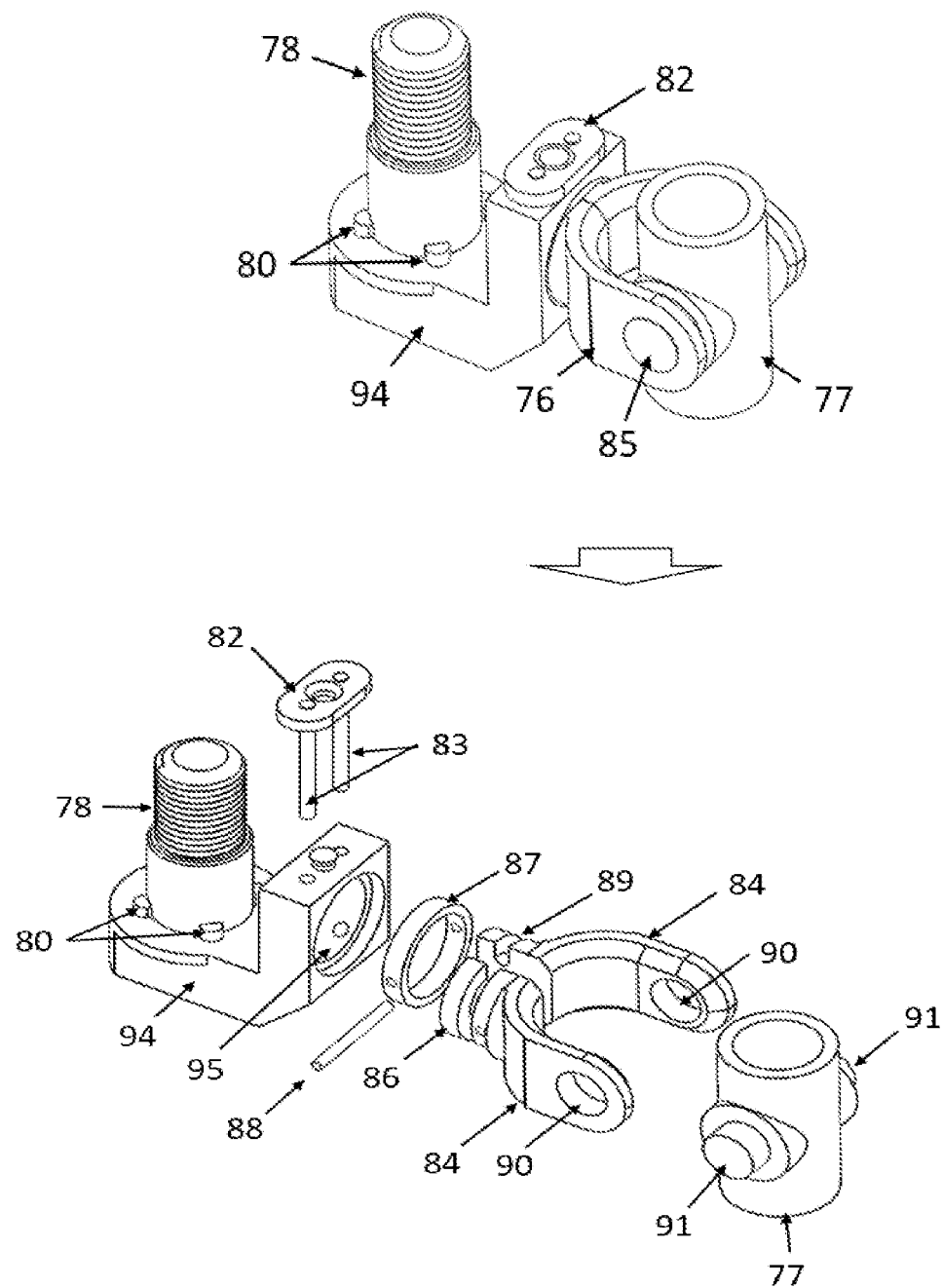
FIG. 33: shows a single strut connector assembly and exploded view.
Figure 34:
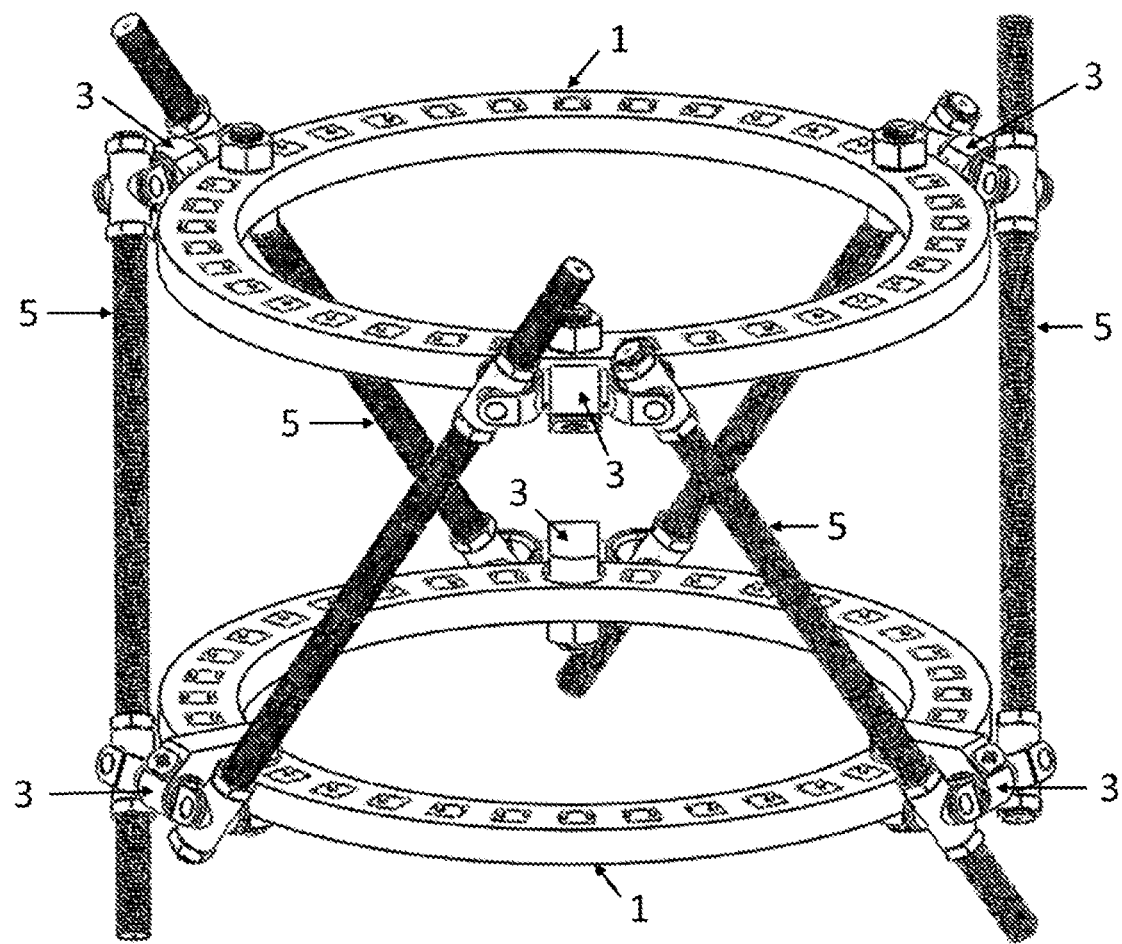
FIG. 34: shows an external fixator construct with two rings connected with six threaded rods in hexapod configuration.
Figure 35:
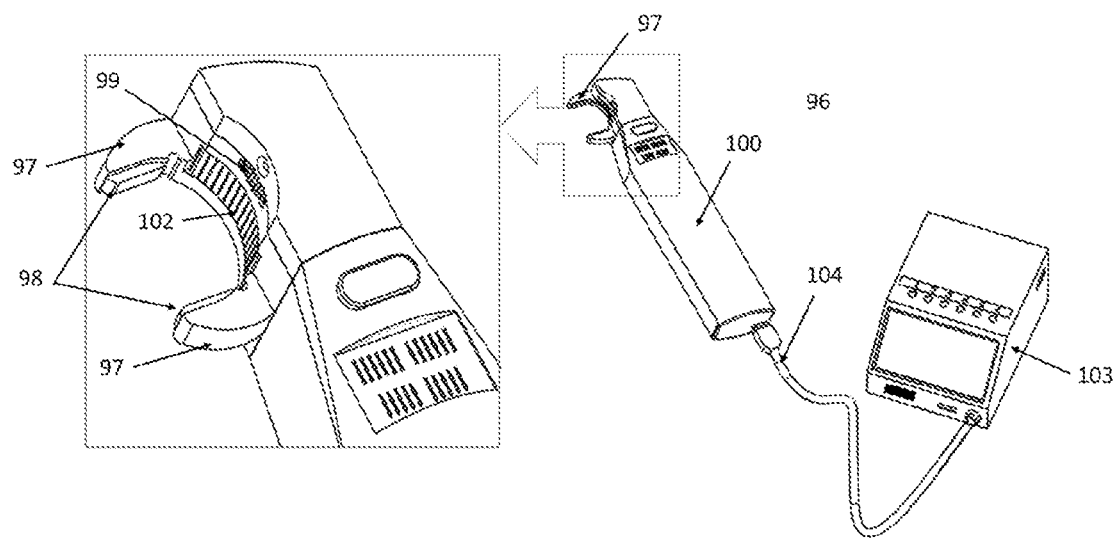
FIG. 35: shows a hand-held motorised driver connected to power supply unit. Inset shows enlarged view of the guide arm.
Figure 36:
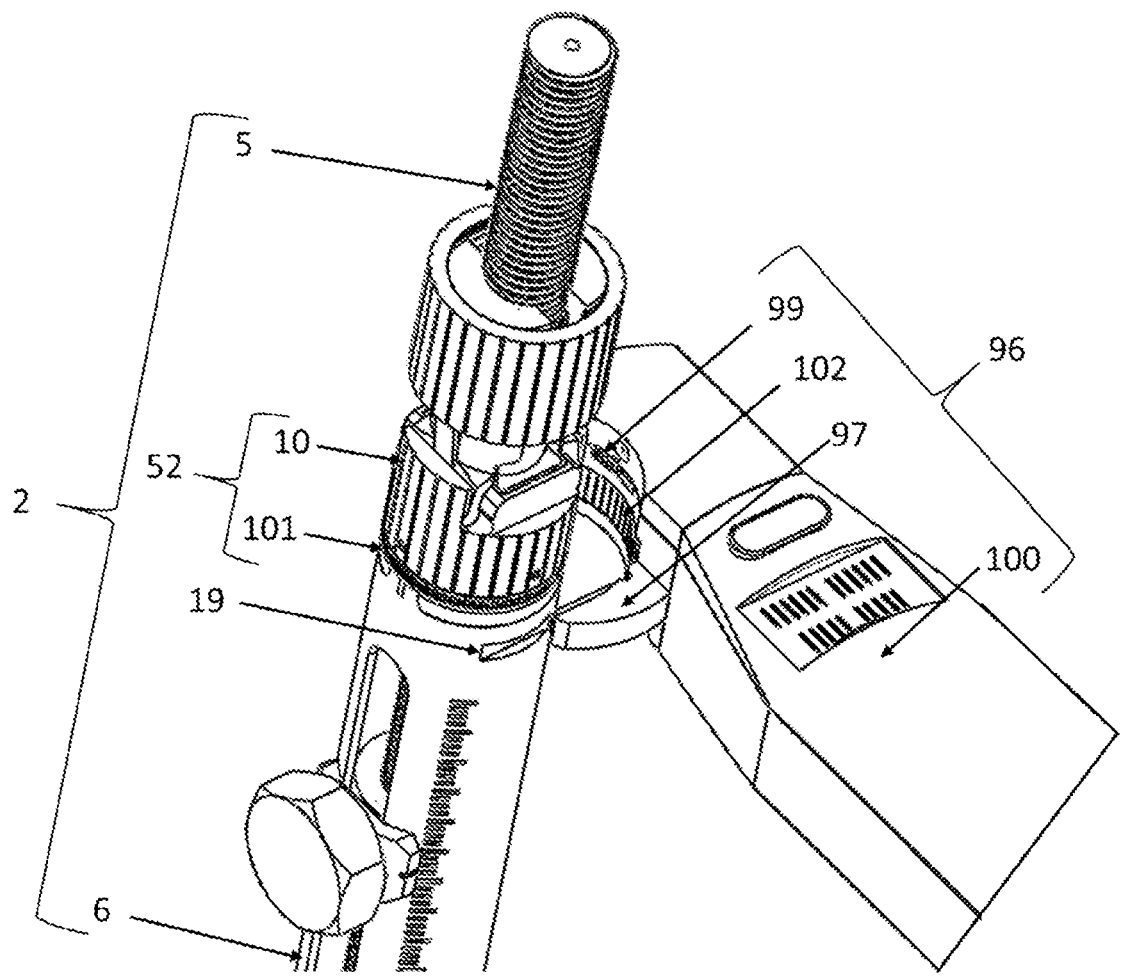
FIG. 36: shows a hand-held motorised driver with custom strut.
Figure 37:
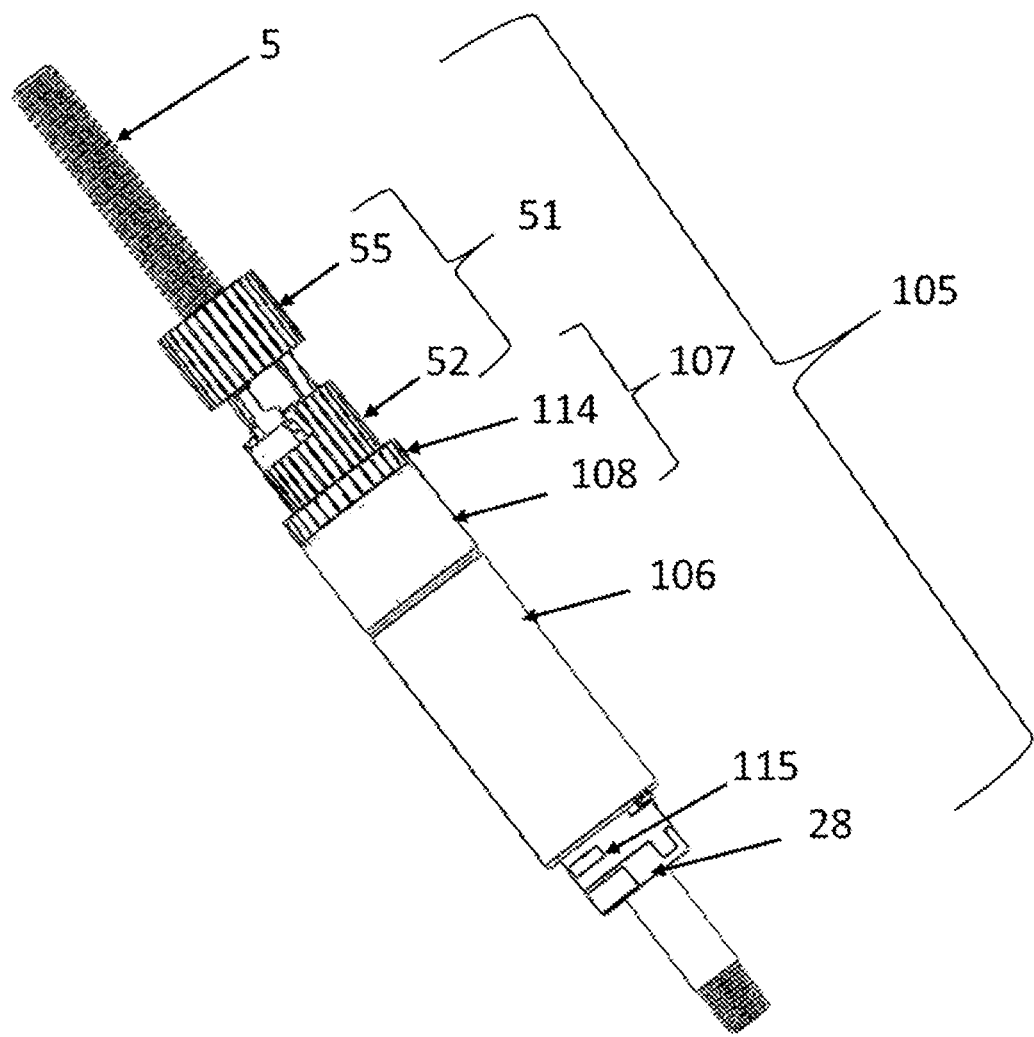
FIG. 37: shows a motorised custom strut assembly.
Figure 38:
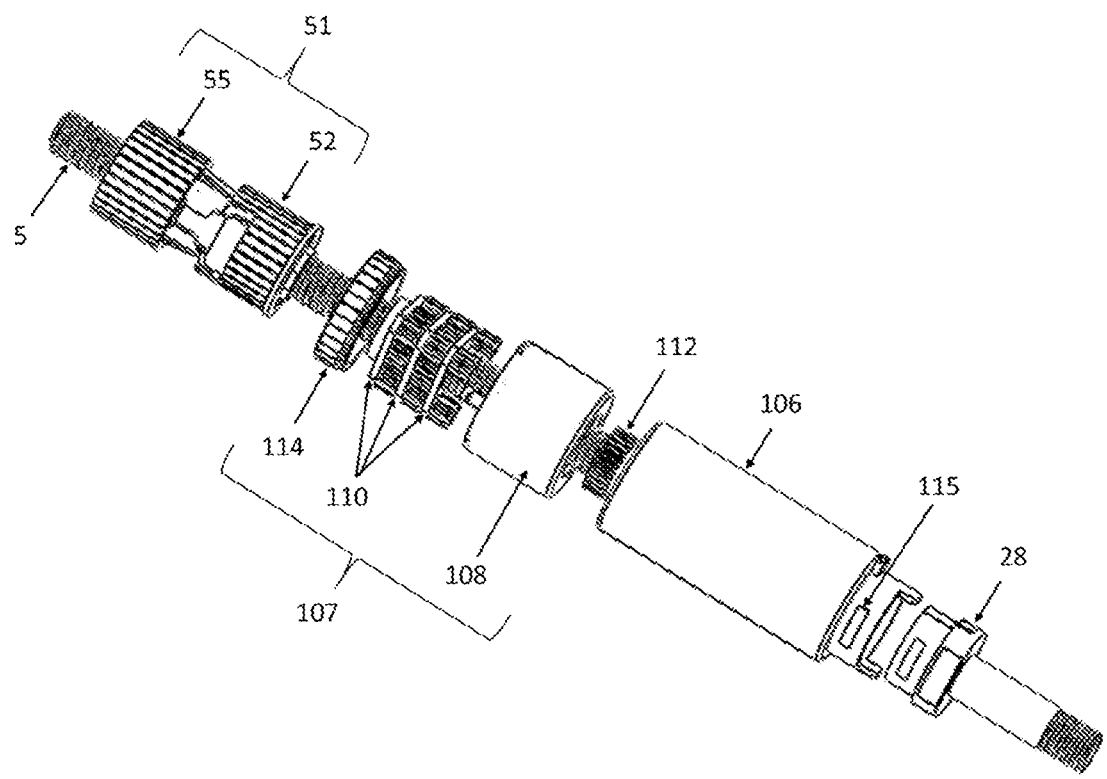
FIG. 38: shows an exploded view of motorised custom strut with threaded rod.
Figure 39:
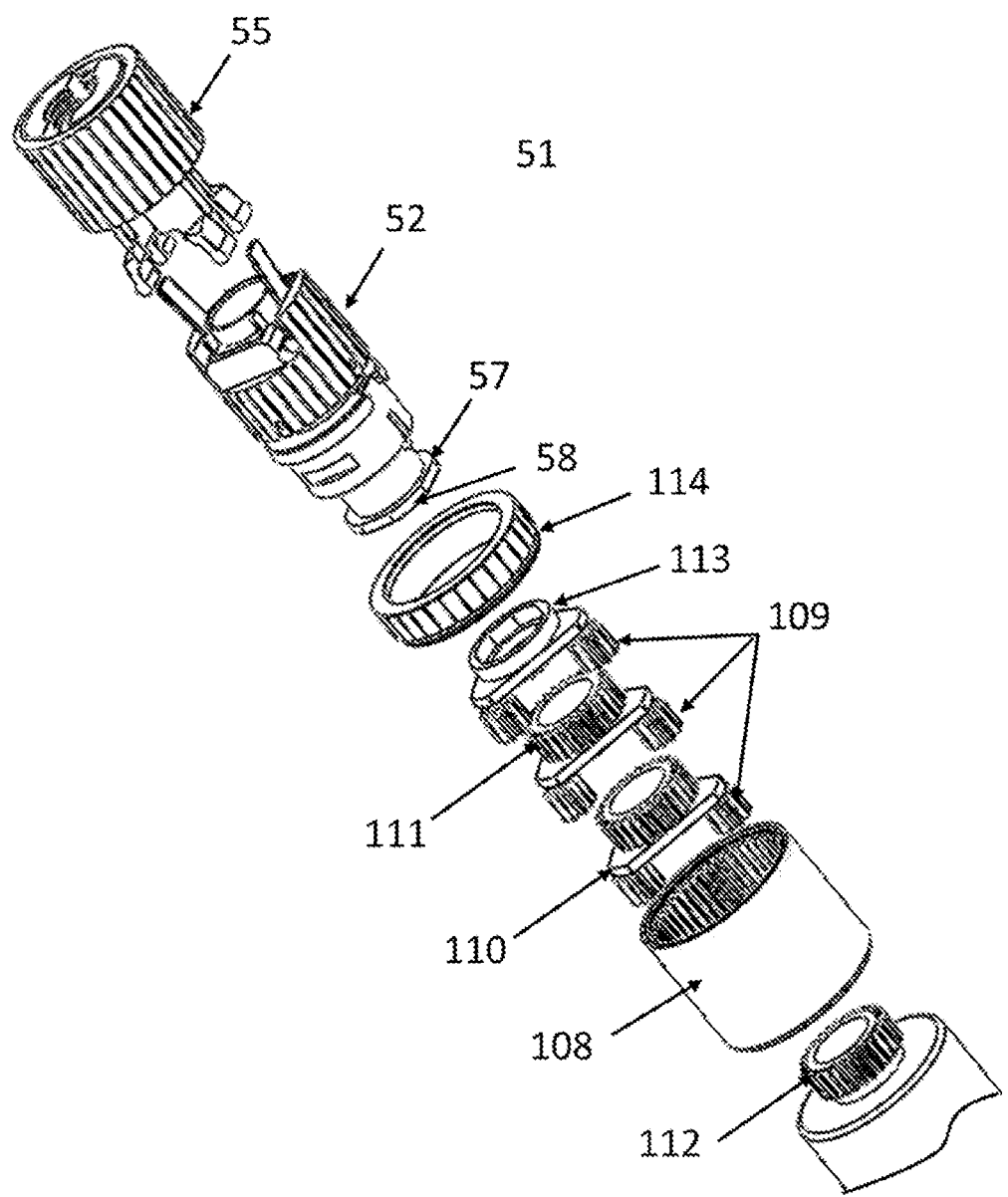
FIG. 39: shows an exploded view of quick connect mechanism with three-stage planetary gear box of the motorised custom strut.
Figure 40:
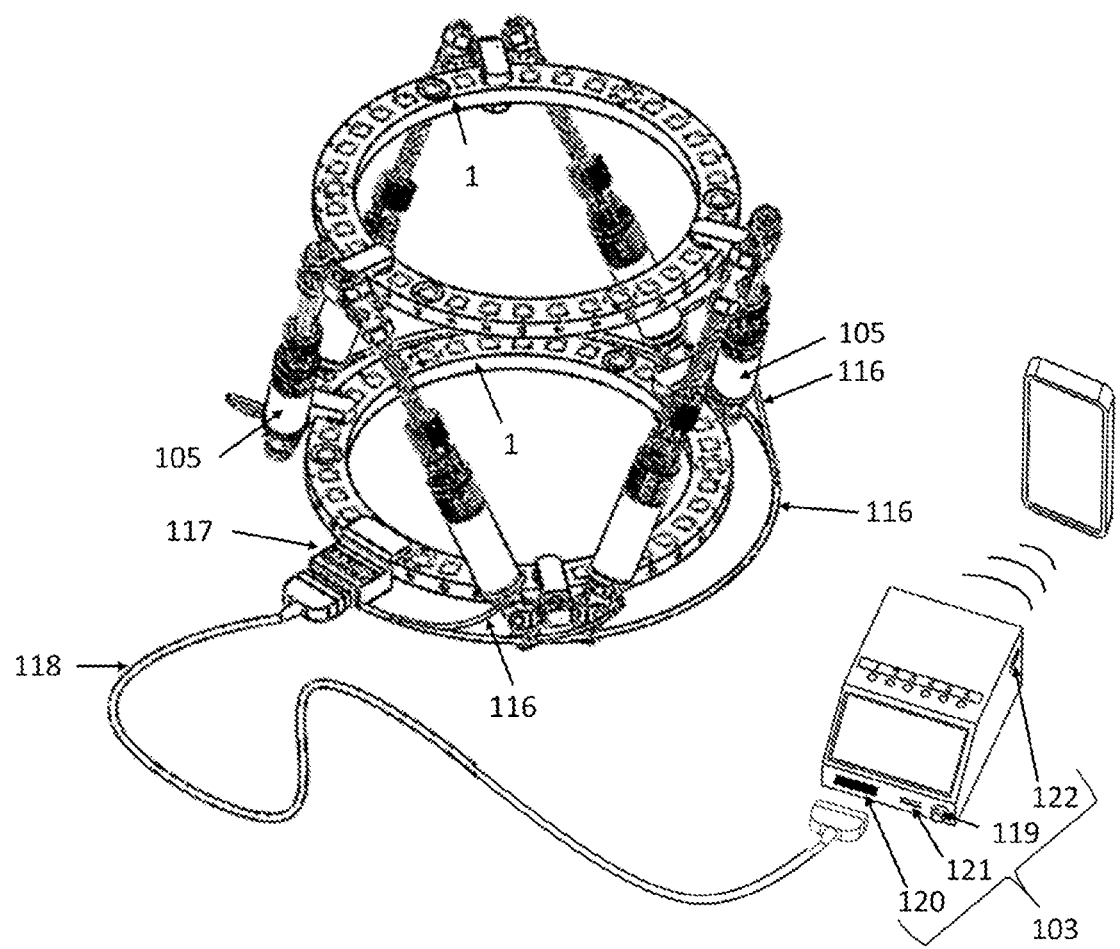
FIG. 40: shows an external fixator construct with two rings and six motorised custom struts in hexapod configuration, and six colour coded cables attached to multi-pin socket box connected to power supply unit using multi-core connecting cable.

Hexapod external fixation system is constructed by connecting two rings (1) with six custom struts (2) via strut connectors (3). The rings have multiple round holes (4) at regular intervals to provide attachment for strut connectors (3) and various bone fixation elements (not shown). Each ring (1) is connected to a bone segment (not shown) using bone fixation elements such as fine trans-osseous wires (not shown) or threaded bone pins (not shown). Thus the two bone segments (not shown), each connected to a ring (1), are stabilised by connecting the two rings (1) to each other using six custom struts (2) via strut connectors (3). The position of one ring (1) relative to the other can be changed by adjusting the length of custom struts (2) in order to manipulate the bone segments for reduction of a fracture or for correction of a deformity.

Each custom strut (2) houses a threaded rod (5) within its cylindrical body (6). Seated at the top end of the cylindrical body (6), is a bushing (7) that provides attachment to a rotatable actuator wheel (8). The bushing (7) also acts as a base on which the rotatable actuator wheel (8) can rotate. The rotatable actuator wheel has a threaded central hole (9) whose threads mate with the threaded rod (5) so that the length of the threaded rod (5) protruding out of the cylindrical body (6) can be adjusted by rotating the rotatable actuator wheel (8). The upper half of the rotatable actuator wheel (8) is expanded with an outer surface that is partly knurled (10) to provide grip and is partly flat (11) across to fit a spanner wrench. The outer surface of the lower half (12) of the rotatable actuator wheel is smooth to articulate with the smooth inner surface (13) of the bushing. A retainer clip (14) seated within a groove (15) at the lower end of the rotatable actuator wheel, secures the rotatable actuator wheel (8) within the bushing (7) while allowing it to rotate freely. The bushing (7) is seated in place at the top of the cylindrical body (6) by a projecting ridge (16) on the outer surface of the bushing. The ridge (16) has two slots (17) on either side so that two anti-rotation lugs (18) extending from the top of the cylindrical body can sit within the slots (17) to provide rotational stability for the bushing (7). The outer surface of the bushing (7) also has two flat grooves (19) on either side so that the cylindrical body (6) can be crimped into these grooves to provide additional rotational stability. The bottom surface of the expanded upper half of the rotatable actuator wheel has multiple holes (20) to provide a locking mechanism. The outer surface of the of the expanded upper half of the rotatable actuator wheel has a line marker (21) that provides visual indication for every turn of the rotatable actuator wheel. A ring shaped locking slider (22) seated around the top end of the cylindrical body (6), has multiple spikes (23) on its upper surface that can lock into the multiple holes (20) in the bottom surface of expanded upper half of rotatable actuator wheel to stop its rotation. The locking slider (22) has two locking clamps (24) projecting from its lower end on either side. Each locking clamp (24) has two position locking grip (25) between its arms to lock around a locking button (26) projecting from either side of the cylindrical body. There is a reference marker (27) on the locking slider that provides reference to the line marker (21) on the rotatable actuator wheel. To rotate the rotatable actuator wheel (8), the patient needs to unlock it first by pulling the locking slider (22) downwards so that the multiple spikes (23) on its upper surface disengage from the multiple holes (20) in the rotatable actuator wheel. The locking slider (22) remains in the unlocked position as the locking button (26) of the cylindrical body is gripped within the upper position of the locking grip (25). To stop movement of the rotatable actuator wheel (8), the patient needs to lock it by pushing the locking slider (22) upwards so that the multiple spikes (23) on its upper surface engage the multiple holes (20) in the rotatable actuator wheel. The locking slider (22) remains in the locked position as the locking button (26) of the cylindrical body is gripped within the lower position of the locking grip (25).

The bottom end of the cylindrical body (6) sits on a platform (28). The lower portion of the platform projecting outside the cylindrical body (6) has two slots (29) for the two anti-rotation lugs (30) extending from the bottom of the cylindrical body to provide rotational stability for the platform (28). The outer surface of the lower portion of the platform is partly flat across (31) to fit a spanner wrench. Upper portion of the platform, seated inside the bottom end of the cylindrical body (6), has two flat grooves (32) on either side so that the cylindrical body (6) can be crimped into these groves to provide additional rotational stability. Projecting from the bottom surface of the platform is a partially threaded post (33) that has a smooth upper portion (34) and a threaded lower portion (35) whose diameter matches the diameter of a threaded rod (5).

Within the cylindrical body (6), there is an end stopper that has a circlet (36) to grip the lower end of the threaded rod (5) to stop it from coming out. A projection (37) on the side of the circlet (36) of the end stopper projects out through a longitudinal aperture (38) in the cylindrical body. This projection (37) has a threaded central bore (39) that mates with the threads of a bolt (40). There is a float (41) around the projection (37) on the side of the circlet of the end stopper. The float (41) has a curved under surface (42) to track on the outer surface of the cylindrical body (6). The float (41) has a hole (43) for a retainer pin (44) that engages a smooth recess (45) in the shaft of the bolt (40) so that the float (41) and the bolt (40) are coupled to each other. The tip (46) of the bolt (40) is pointed to grip the threaded rod (5). The inner surface of the circlet (36) of the end stopper has a pointed spike (47) to grip the threaded rod (5) when the bolt (40) is tightened. The outer surface of the circlet (36) of the end stopper has a spacer (48) to centralise it within the cylindrical body (6). The float has a marker line (49) on its side to indicate the position of the end stopper relative to the graduated scale markings (50) on the outer surface of the cylindrical body. The graduated scale markings (50) do not reflect the overall length of the custom strut (2), but indicate the relative change in length when the rotatable actuator wheel (8) is rotated to adjust the length.

Custom strut can also be modified with a quick connect mechanism (51) to enable the Surgeon to connect the threaded rod (5) at any desired level within the cylindrical body (6) of the strut without having to thread it from one end. The quick connect mechanism (51) has a modified rotatable actuator wheel (52), a modified bushing (53), a split nut with two arms (54) and a locking barrel (55). The modified rotatable actuator wheel (52) is coupled in its centre to a hollow tube (56) that has no internal threads and therefore, does not mate with the threaded rod (5). The lower end of the hollow tube (56) has a swaged retainer collar (57) to keep it in place within the modified bushing (53) so that the modified bushing (53) acts as a base for the rotation of modified rotatable actuator wheel (52) coupled to hollow tube (56). The swaged retainer collar (57) is circular with four flat cut surfaces (58) so that a cantilever spring (59) attached to the modified bushing (53) makes contact and provides four position haptic feedback for every quarter turn. The top surface of the modified rotatable actuator wheel has a groove (60) each on two sides of the hollow tube (56) and a slot each (61) on the other two sides of the hollow tube (56). The two arms of the split nut (54) are identical to each other. The top half of each arm has threads on its inner surface (62) to mate with the threaded rod (5) and threads on its outer surface (63) to mate with the locking barrel (55). The lower end of each arm of split nut has a ridge (64) that articulates within the groove (60) on the top surface of the modified rotatable actuator wheel. There is a recess (65) in the middle of the ridge (64) into which a long leaf spring (66) can be seated to retain each arm of the split nut (54) in the groove (60) of the modified rotatable actuator wheel (52). The bottom half of long leaf spring (66) is held in a channel (67) within the modified rotatable actuator wheel. The top half of long leaf spring (66) is accommodated within a longitudinal slot (68) on the outer surface of each arm of split nut (54). A dual arm leaf spring (69) is seated within the slot (61) on the top of the modified rotatable actuator wheel, the arms of which press against the inner surface of the arms of the split nut (54) to keep them open. The bottom of the dual arm leaf spring (69) grips the hollow tube (56) at the gripping slots (70) on either side of the hollow tube (56). Locking barrel (55) surrounding the two arms of the split nut (54) has a knurled outer surface (71) for gripping. The threads on the upper half of its inner surface (72) engage the threads on the outer surface (63) of the two arms of the split nut so that the split nut remains closed in locked position. The lower half of the inner surface (73) of the locking barrel is smooth to accommodate the long leaf spring (66). There is step cut recess (74) at the lower end of the inner surface of the locking barrel (55) to accommodate the top end of the long leaf spring (66). In the unlocked position, the locking barrel (55) is around the lower half of the arms of the split nut (54) allowing them to open fully while the long leaf spring (66) is accommodated within the longitudinal slot (68) on the outer surface of the arm of the split nut and smooth inner surface (73) of the lower half of the locking barrel. In this unlocked position, the arms of the split nut (54) are kept wide open by the action of two dual arm leaf springs (69) on either side so that the threads on the inner surface (62) of the split nut do not make any contact with the threads of the threaded rod (5) which allows the Surgeon to insert threaded rod (5) into the custom strut (2) smoothly without any resistance. Once the threaded rod (5) is inserted into the body of the custom strut (2), the Surgeon can lock the quick connect mechanism (51) by turning the locking barrel (55) so that the threads on its inner surface (72) engage the threads on the outer surface (63) of the split nut closing the two arms of the split nut (54). In this locked position, the threads on the inner surface (62) of the split nut mate with the threads of the threaded rod (5) so that turning of modified rotatable actuator wheel (52) causes the threaded rod (5) to translate, effecting a change in overall length of the custom strut (2). In the locked position, long leaf spring (66) opens outwards so that the top end of the long leaf spring (66) slips into the step cut recess (74) at the lower end of the inner surface of the locking barrel, keeping the locking barrel (55) in the locked position. Surgeon can unlock the quick connect mechanism (51) by pressing the long leaf spring (66) on either side so that it is accommodated within the smooth inner surface (73) of lower half of the locking barrel as the locking barrel (55) is turned.

Each strut connector (3) has a body (75) with two rotating clamps (76), each of which support a pivoting ring-shaped holder (77). The body (75) has a threaded post (78) at one end that can be inserted into one of the holes (4) in the ring (1) and secured with a nut. The other end of the body (75) has a round cavity (79) that opens on both sides of the body. There are four lugs (80) around the base of the threaded post (78) that interdigitate with the four indentations (81) around the holes in the ring to provide rotational stability for the strut connector (3). The round cavity (79) in the body provides seating for the two rotating clamps (76), one each on either side of the body (75). A plate (82) attached to the outer surface of the body has two retainer pins (83) protruding into the round cavity (79).

Each rotating clamp (76) consists of two separate arms (84) forming a semi-circular support for the pivoting ring-shaped holder (77) via two hinges (85) on either side. Each arm (84) has a half disc-shaped base (86) seated within the round cavity (79) of the body of the strut connector. The half disc-shaped bases (86) of the two arms are held together by a hoop (87) and a securing pin (88) to form a full disc that rotates freely within the round cavity (79). A circumferential groove (89) on the outer surface of each of the half disc-shaped bases (86) is engaged by the retainer pin (83) to secure the half disc-shaped bases (86) within the round cavity (79) of the body. The hinges (85) are formed by the articulation of a gudgeon (90) in each arm (84) of the rotating clamp with the pintles (91) on either side of the pivoting ring-shaped holder (77). The common axis of the two hinges (85) about which the ring-shaped holder (77) pivots, is orthogonal to the axis of the rotating disc formed by the binding of two half disc-shaped bases (86) of the rotating clamp (76).

Threaded rod (5) from the custom strut (2) is attached to the strut connector (3) on the upper ring (1) by inserting it into the pivoting ring-shaped holder (77) and gripping the ring-shaped holder (77) with two nuts around the threaded rod (5), one above and one below the pivoting ring-shaped holder (77). Once the nuts are tightened, no movement occurs between the threaded rod (5) and the pivoting ring-shaped holder (77) but the ring-shaped holder (77) can freely pivot at the two hinges (85) and the rotating clamp (76) can freely rotate within the body cavity (79) of the strut connector (3). The pivoting and rotating axes are orthogonal to each other. Partially threaded post (33) at the bottom of the custom strut is attached to the strut connector (3) on the lower ring (1) by inserting it into the pivoting ring-shaped holder (77) and fastening with a nylon-insert lock nut (92) around the threaded portion of the post (35). During gradual deformity correction phase, the nylon-insert lock nut (92) is not fastened fully tight against the pivoting ring-shaped holder (77) but is kept very close to it without gripping it. This allows the custom strut (2) to rotate about its own longitudinal axis within the pivoting ring-shaped holder (77) but no translational movement along the longitudinal axis of the of the custom strut (2) occurs within the pivoting ring-shaped holder (77). Thus, at the attachment of the custom strut (2) to the lower ring (1), there is free rotational movement about three axes orthogonal to each other providing three degrees of rotational freedom for the strut: first is the axis of the two hinges (85) about which the pivoting movement of the ring-shaped holder (77) occurs, second is the axis of rotation of the rotating clamp (76) and third is the axis of rotation of the smooth portion of the post (34) of the custom strut within the pivoting ring-shaped holder (77). These three orthogonal axes intersect each other at a single coincident point of universal rotation situated at the centre of the ring-shaped holder (77), where the Surgeon can attach the custom strut (2) to the strut connector (3). When the length of any one of the custom struts (2) is adjusted, the relative position of the six custom struts (2) change and the new position of each of the custom strut (2) is accommodated by the three degrees of rotational freedom available for the custom struts (2) at their connection to the rings (1) via strut connectors (3). The custom struts (2) can therefore be used as six degrees of freedom (6 DOF) parallel manipulators to manipulate bone segments for fracture reduction or deformity correction by adjusting their lengths. During the consolidation phase of bone healing, the nylon-insert lock nut (92) is fastened fully tight so that it grips the pivoting ring-shaped holder (77) stopping any rotational movements of the custom strut (2) about its own longitudinal axis within the pivoting ring-shaped holder (77), thus reducing three degrees of rotational freedom to two degrees of rotational freedom for the custom strut (2) to provide a stable environment for bone healing.

The custom struts (2), strut connectors (3) and threaded rods (5) are manufactured and supplied from the factory separately, without pre-assembling them together. Threaded rods (5) are straight rods with threads on their external surface, same as the threaded rods commonly used to connect rings (1) to each other in a conventional ring external fixator system. They are not configured or modified in any way to provide anchoring points in order to irreversibly couple them to the struts (2) or strut connectors (3) during their manufacture in the factory. To assemble the custom strut (2), the user i.e., the Surgeon needs to attach one end of the threaded rod (5) to the body of the strut by threading it to the rotatable actuator wheel (8) and attach the other end of the threaded rod (5) to the strut connector (3) by inserting it into the pivoting ring-shaped holder (77) and fastening it with two nuts, one above and one below the pivoting ring-shaped holder (77). Therefore, the Surgeon is able to choose a threaded rod (5) of optimum length to ensure that there is maximum range of excursion available within the cylindrical body (6) of the strut, minimising the need for change of strut during the course of deformity correction. If a threaded rod (5) of required length is not available to assemble a custom strut, longer threaded rod (5) can be used in its place and connected to the pivoting ring-shaped holder (77) in such a way that the excess length of the threaded rod (5) protrudes through and beyond the pivoting ring-shaped holder (77), thus preserving the range of excursion available for the threaded rod (5) within the cylindrical body (6) for length adjustment of the custom strut (2). Occasionally during the course of gradual correction of severe deformity, if the threaded rod (5) reaches the limit of range of excursion within the cylindrical body (6) of the strut, the threaded rod (5) can be changed to that of a different length rather than changing the entire strut.

Hexapod external fixator constructed by the user i.e. the Surgeon, consists of two rings (1) attached to a bone segment each, connected to each other by six custom struts (2) using strut connectors (3). Upper and lower rings (1) have three strut connectors (3) each placed at equal distance. Each strut connector (3) on a ring (1) provides attachment for a pair of custom struts (2) that are attached to two different strut connectors (3) adjacent to each other on the other ring (1) creating an inclination of the custom struts (2) that results in a stable hexapod construct. In severe deformities, the position of any of the strut connectors (3) can be changed to avoid the strut impinging on the limb, resulting in an unequal distance between the three strut connectors (3) on the ring (1). Occasionally in severe deformities it may not be possible to attach the two custom struts (2) of a pair to the same strut connector (3) due to strut impinging on the limb. In these cases, the two custom struts (2) of a pair can be attached to two different single strut connectors (93) placed a few holes (4) apart on the ring (1) to avoid strut impingement. Thus, the Surgeon can variably position a custom strut (2) on the ring (1), either by choosing any desired hole to connect a strut connector (3) with a pair of struts attached to it or by using single strut connectors (93) to attach individual custom struts (2) separately. Single strut connector (93) is similar to the strut connector (3) described above except for the body (94) that is smaller with a smaller round cavity (95) but has identical threaded post (78). The round cavity (95) opens facing outwards from the ring and provides seating for one rotating clamp (76) that supports one pivoting ring-shaped holder (77). The rotating clamp (76) is secured within the round cavity (95) with identical plate (82) attached to the outer surface of the body (94) that has two retainer pins (83) protruding into the round cavity (95).

When stabilising a fracture with this external fixation system, the two rings (1) attached to a bone segment each, can also be connected to each other using six threaded rods (5) directly via strut connectors (3) without the need for custom struts (2). Each threaded rod (5) is directly inserted into the pivoting ring-shaped holder (77) of the respective strut connector (3) both at the upper end and at the lower end and secured by fastening nuts to the threaded rods (5). A pair of threaded rods (5) attached to a strut connector (3) on one ring (1) are attached at their other end to two adjacent strut connectors (3) on the other ring (1), creating an inclination of the threaded rods (5) that results in a hexapod configuration. If a pair of threaded rods (5) attached to a strut connector (3) protrude through and beyond their respective pivoting ring-shaped holders (77), they may impinge on each other. To avoid impingement of the threaded rods (5) of a pair, one of them can be left protruding beyond the pivoting ring-shaped holder (77) and the other kept flushed with the pivoting ring-shaped holder (77). The threaded rod (5) that is kept flushed with the pivoting ring-shaped holder (77) at its one end can be left protruding at its other end beyond the pivoting ring-shaped holder (77) of the strut connector (3) on the other ring (1). Thus, alternating threaded rods (5) can be left protruding to avoid impingement against each other. Fracture is first reduced by manually applying traction to one of the rings (1) in order to manipulate the bone segments while keeping the nuts around the threaded rods (5) loose so that the threaded rods (5) can glide freely within the pivoting ring-shaped holders (77) during the reduction manoeuvre. When the reduction manoeuvre is complete, the fixator construct is stabilised by tightening the nuts around the threaded rods (5) so that they grip the pivoting ring-shaped holders (77).

Gradual manipulation of bone segments for gradual correction of deformity requires changing of position of one ring (1) relative to the other by adjustment of length of custom struts (2) as per the program of correction prepared by the Surgeon. Program of correction has a schedule for daily adjustment of length of six custom struts (2) that needs to be executed by the patient, by manually rotating the rotatable actuator wheel (8) or modified rotatable actuator wheel (52). Some patients who are not able to execute the correction program manually can be given a hand-held motorised driver (96) to perform the daily length adjustment of custom struts (2). The hand-held motorised driver has a guide arm (97) shaped like an open-ended spanner. The guide arm (97) has two ridges (98) on the inner surface of its two ends, that can sit within the two flat grooves (19) of the bushing (7) into which the cylindrical body (6) has been crimped, so that guide arm (97) is located accurately in relationship to the custom strut (2). In the centre of the inner surface of the guide arm (97) is a gear wheel (99) that is driven by a DC (direct current) motor situated within the body (100) of the hand-held motorised driver. In order to adjust the length of the custom struts (2), the rotatable actuator wheel (8) or modified rotatable actuator wheel (52) can be rotationally driven by engaging the gear wheel (99) of the hand-held motorised driver with a gear wheel (101) situated at the lower end of the knurled surface (10) of the rotatable actuator wheel (8) and modified rotatable actuator wheel (52). The hand-held motorised driver (96) has a reader for automatic identification and data capture (102) which can be either an optical scanner that can read the linear/matrix barcode sticker labels (not shown) stuck on the custom struts (2) or a radio frequency identification (RFID) reader that can read the RFID tags (not shown) placed on the custom struts (2) so that the six different custom struts (2) of the hexapod external fixator system can be identified. The hand-held motorised driver (96) is powered by connecting it to a power supply unit (103) using a connecting cable (104).

If some patients are unable to operate the hand held motorised driver (96), the Surgeon can use motorised custom struts (105 to construct the hexapod external fixator. In the place of cylindrical body (6) of the custom strut (2), the motorised custom strut (105) has a cannulated DC (direct current) motor (106) with a three-stage planetary gear box (107) attached to its upper end. The bottom end of the cannulated DC motor (106) sits on the platform (28). The planetary gear box (107) consists of a three-stage reduction system within a ring gear (108). Each stage consists of three planet gears (109) attached to a carrier (110) which has a cannulated sun gear (111) at its centre. The cannulated sun gear (111) of the first stage situated at the lower end of the planetary gear box (107), engages the cannulated output shaft (112) of the cannulated DC motor (106). The modified cannulated sun gear (113) of the third stage situated at the upper end of the planetary gear box (107) has four flat surfaces on its inner side that engage the four flat cut surfaces (58) of the swaged retainer collar (57) at the lower end of the hollow tube (56) that is coupled to the modified rotatable actuator wheel (52). Top cover (114) of the planetary gear box (107) provides a support base for the modified rotatable actuator wheel (52). The rotational driving force generated by the cannulated DC motor (106) is transmitted by the planetary gear box (107) to the modified rotatable actuator wheel (52) and in doing so, the torque of the rotational driving force is increased incrementally at each of the three stages of planetary gear box (107). A threaded rod (5) of optimum length, connected to the quick connect mechanism (51), engages the modified rotatable actuator wheel (52) and can glide through the centre of the cannulated sun gears (111) of each of the three stages of planetary gear box (107), and through the hollow centre of the cannulated DC motor (106) without engaging any of them. Therefore, the range of excursion of the threaded rod within the motorised custom strut (105) remains equal to the range of excursion of the threaded rod within the custom strut (2). The cannulated DC motor has a power socket (115) at its lower end to which a colour coded cable (116) can be attached. The six different colour coded cables (116), each with specific colour code for the six different motorised custom struts (105) of the hexapod external fixator system, are attached to a multi-pin socket box (117). Each of the six motorised custom struts (105) of the hexapod external fixator system can be powered and controlled by connecting the multi-pin socket box (117) to the power supply unit (103) using a multi-core connecting cable (118).

The power supply unit (103) has a socket (119) for the connecting cable (104) of hand-held motorised driver and another socket (120) for connecting the multi-core connecting cable (118) in order to provide appropriate voltage direct current to hand-held motorised driver (96) and to motorised custom struts (105) respectively. The power supply unit (103) can communicate with a computer or any mobile digital processor such as mobile phone either via a wired connection connected to its digital connection socket (121) similar to Universal serial bus (USB) or via a wireless connection such as WiFi or Bluetooth for which it has the appropriate wireless receiver/transmitter (not shown). It has a socket (122) for connecting the mains power supply cable to recharge its batteries (not shown) within it. The power supply unit (103) has the necessary electronic components (not shown) to communicate with and execute the commands from a computer or any mobile digital processor such as mobile phone. Using appropriate digital software, the computer or a mobile digital processor can identify each of the six custom struts (2) of the hexapod external fixator system by interpreting the digital signals sent by the automatic identification and data capture reader (102) of the hand-held motorised driver and send the necessary commands to the hand-held motorised driver (96) to execute the appropriate amount of length adjustment of each of the six custom struts (2) as per the daily schedule of correction prepared by the Surgeon. The computer or a mobile digital processor can also send the necessary commands to each of the six motorised custom struts (105) of the hexapod external fixator system through the multi-core connecting cable (118) and the six different colour coded cables (116) to execute the appropriate amount of length adjustment of each of the six motorised custom struts (105) as per the daily schedule of correction prepared by the Surgeon.

NUMBERED PARTS LISTING

1. Ring
2. Custom strut
3. Strut connector
4. Holes in the ring
5. Threaded rod
6. Cylindrical body of the custom strut
7. Bushing at the top end of the cylindrical body
8. Rotatable actuator wheel
9. Threaded central hole of the rotatable actuator wheel
10. Knurled surface of rotatable actuator wheel
11. Flat across surface of the rotatable actuator wheel
12. Smooth outer surface of the lower half of rotatable actuator wheel
13. Smooth inner surface of the bushing
14. Retainer clip
15. Groove at the lower end of rotatable actuator wheel
16. Ridge on the outer surface of the bushing
17. Slots in the ridge on the outer surface of the bushing 18. Anti-rotation lugs extending from the top of the cylindrical body
19. Flat grooves on the outer surface of the bushing
20. Multiple holes in the bottom surface of expanded upper half of rotatable actuator wheel
21. Line marker on the outer surface of expanded upper half of rotatable actuator wheel
22. Locking slider
23. Multiple spikes on the upper surface of the locking slider
24. Locking clamps of the locking slider
25. Two position locking grip in the locking clamp
26. Locking button projecting on either side of the cylindrical body
27. Reference marker on the locking slider
28. Platform at the bottom end of the cylindrical body
29. Slots in the lower part of the platform
30. Anti-rotation lugs extending from the bottom of the cylindrical body
31. Flat across surface on the lower part of the platform
32. Flat grooves on the outer surface of the upper part of the platform
33. Partially threaded post at the bottom of the platform
34. Smooth upper portion of the post at the bottom of the platform
35. Threaded lower portion of the post at the bottom of the platform
36. Circlet of the end stopper
37. Projection on the side of the circlet of the end stopper
38. Longitudinal aperture in the cylindrical body
39. Threaded central bore in the projection on the side of the circlet of the end stopper
40. Bolt of the end stopper
41. Float of the end stopper
42. Curved under surface of the float
43. Hole in the float
44. Retainer pin in the float
45. Smooth recess in the shaft of the bolt
46. Pointed tip of the bolt
47. Pointed spike on the inner surface of the circlet of the end stopper
48. Spacer on the outer surface of the circlet of the end stopper
49. Marker line on the side of the float
50. Graduated scale markings on the outer surface of the cylindrical body
51. Quick connect mechanism
52. Modified rotatable actuator wheel
53. Modified bushing
54. Split nut with two arms
55. Locking barrel
56. Hollow tube
57. Swaged retainer collar at the lower end of hollow tube
58. Four flat cut surfaces of the swaged retainer collar
59. Cantilever spring of the modified bushing
60. Grooves on the top surface of the modified rotatable actuator wheel
61. Slots on the top surface of the modified rotatable actuator wheel
62. Threads on the inner surface of the split nut
63. Threads on the outer surface of the split nut
64. Ridge at the lower end of each arm of split nut
65. Recess in the middle of the ridge at the lower end of each arm of split nut
66. Long leaf spring
67. Channel for the long leaf spring in the modified rotatable actuator wheel
68. Longitudinal slot on the outer surface of the arm of split nut
69. Dual arm leaf spring
70. Gripping slots on the side of the hollow tube
71. Knurled outer surface on the locking barrel
72. Threaded inner surface of upper half of the locking barrel
73. Smooth inner surface of lower half of the locking barrel
74. Step cut recess at the lower end of the inner surface of the locking barrel
75. Body of the strut connector
76. Rotating clamp of the strut connector
77. Pivoting ring-shaped holder of the strut connector
78. Threaded post in the body of the strut connector
79. Round cavity in the body of the strut connector
80. Four lugs around the base of the threaded post
81. Four indentations around the holes in the ring
82. Plate on the outer surface of the body of the strut connector
83. Retainer pins protruding into the cavity of the body of the strut connector
84. Arms of the rotating clamp
85. Hinge articulation between the arm of the rotating clamp and pivoting ring-shaped holder
86. Half disc-shaped base of the arm of the rotating clamp
87. Hoop of the rotating clamp
88. Securing pin of the rotating clamp
89. Circumferential groove on the half disc shaped base of the arm of the rotating clamp
90. Gudgeon in the arm of the rotating clamp
91. Pintles on either side of the pivoting ring-shaped holder
92. Nylon-insert lock nut
93. Single strut connector
94. Body of the single strut connector
95. Round cavity in the body of single strut connector
96. Hand-held motorised driver
97. Guide arm of the hand-held motorised driver
98. Ridges on the guide arm
99. Gear wheel of the hand-held motorised driver
100. Body of the hand-held motorised driver containing a DC (direct current) motor
101. Gear wheel of the rotatable actuator wheel and modified rotatable actuator wheel
102. Automatic identification and data capture reader of the hand-held motorised driver
103. Power supply unit
104. Connecting cable of the hand-held motorised driver
105. Motorised custom strut
106. Cannulated DC (direct current) motor
107. Three-stage planetary gear box
108. Ring gear of the planetary gear box
109. Planet gear of the planetary gear box
110. Carrier for the planet gears of the planetary gear box
111. Cannulated sun gear at the centre of the carrier for the planet gears
112. Cannulated output shaft of the cannulated DC motor
113. Modified cannulated sun gear of the third stage of planetary gear box
114. Top cover of the planetary gear box.
115. Power socket of the cannulated DC motor
116. Colour coded cable for the cannulated DC motor
117. Multi-pin socket box attached to six colour coded cables
118. Multi-core connecting cable 119. Socket for the connecting cable of hand-held motorised driver
120. Socket for the multi-core connecting cable
121. Digital connection socket for connecting a computer or mobile digital processor
122. Socket for the mains power supply cable

The invention claimed is:

1. An external bone fixation system, comprising:
a first platform comprising a first ring configured to be placed around a limb and hold a first segment of bone;
a second platform comprising a second ring configured to be placed around the limb and hold a second segment of bone;
a plurality of strut connectors, wherein each strut connector comprises a body with one or two rotating clamps, each of which supports a pivoting ring-shaped holder; and
a plurality of bone fixation elements, comprising fine trans-osseous wires and/or threaded bone pins,
wherein the first and second rings include multiple round holes at regular intervals to which the plurality of strut connectors and the plurality of bone fixation elements are attached,
wherein the plurality of bone fixation elements connect each of the first and second rings to a respective first and second bone segment,
wherein, the first and second rings are connected to each other via struts fastened to at least six of the plurality of strut connectors to stabilize the first and second bone segments connected to the respective first and second rings,
wherein each strut comprises a threaded rod with ends that can be inserted into the pivoting ring-shaped holder and fastened by two nuts, one above and one below the pivoting ring-shaped holder, and
wherein a position of the first ring relative to the second ring is changed by adjusting the length of the struts fastened between the plurality of strut connectors in order to manipulate the first and second bone segments for reduction of a fracture or for correction of a deformity.

2. The external bone fixation system as claimed in claim 1, wherein each strut is a custom strut that comprises said threaded rod housed within a cylindrical body that has a bushing seated at its top, which provides attachment to a rotatable actuator wheel and also acts as a base on which the rotatable actuator wheel can rotate,
wherein the rotatable actuator wheel includes a threaded central hole whose threads mate with the threaded rod so that the length of the threaded rod protruding out of the cylindrical body can be adjusted by rotating the rotatable actuator wheel, and the rotatable actuator wheel includes an expanded upper half whose outer surface is partly knurled to provide grip and is partly flat across to fit a spanner wrench and has a lower half whose outer surface is smooth to articulate with the smooth inner surface of the bushing;
wherein a retainer clip seated within a groove at the lower end of the rotatable actuator wheel, secures the rotatable actuator wheel within the bushing, allowing it to rotate freely while the bushing is seated in place at the top of the cylindrical body by a projecting ridge on the outer surface of the bushing that has two slots on either side so that two anti-rotation lugs extending from the top of the cylindrical body can sit within the slots to provide rotational stability for the bushing and additional rotational stability is provided by the crimping of the cylindrical body into two flat grooves on either side of the outer surface of the bushing,
wherein a bottom surface of the expanded upper half of the rotatable actuator wheel includes multiple holes into which multiple spikes on the upper surface of a ring shaped locking slider, seated around the top end of the cylindrical body, can lock to stop the rotation of rotatable actuator wheel, while visual indication of every turn of the rotatable actuator wheel is provided by a line marker on the outer surface of its expanded upper half against a reference marker on the locking slider,
wherein a bottom end of the cylindrical body sits on a platform whose lower portion projecting outside the cylindrical body has two slots for the two anti-rotation lugs extending from the bottom end of the cylindrical body to provide rotational stability to it with its outer surface partly flat across to fit a spanner wrench and the upper portion of the platform, seated inside the bottom end of the cylindrical body, has two flat grooves on either side so that the cylindrical body can be crimped into these grooves to provide additional rotational stability, while projecting from the bottom surface of the platform, is a partially threaded post that has a smooth upper portion and a threaded lower portion whose diameter matches the diameter of a threaded rod, and
wherein within the cylindrical body, there is an end stopper that has a circlet to grip the lower end of the threaded rod to stop it from coming out, and the circlet includes a projection on its side projecting out through a longitudinal aperture in the cylindrical body, the projection having a threaded central bore that mates with the threads of a bolt while the inner surface of the circlet has a pointed spike to grip the threaded rod when the bolt with its pointed tip is tightened and the outer surface of the circlet has a spacer to centralize it within the cylindrical body.

3. The external bone fixation system as claimed in claim 2, wherein the locking slider includes two locking clamps projecting from its lower end on either side, each locking clamp having a two position locking grip between its arms to lock around a locking button projecting from either side of the cylindrical body so that unlocking of a rotatable actuator wheel to rotate the cylindrical body can be performed by pulling the locking slider downwards to disengage the multiple spikes on its upper surface from the multiple holes in the rotatable actuator wheel while the locking slider remains in the unlocked position as the locking button of the cylindrical body is gripped within the upper position of the locking grip, and locking of the rotatable actuator wheel to stop its movement can be performed by pushing the locking slider upwards to engage the multiple spikes on its upper surface into the multiple holes in the rotatable actuator wheel while the locking slider remains in the locked position as the locking button of the cylindrical body is gripped within the lower position of the locking grip.

4. The external bone fixation system as claimed in claim 2, further comprising a float around the projection on the side of the circlet of the end stopper, with a curved under surface to track on the outer surface of the cylindrical body, and a hole for a retainer pin that engages a smooth recess in the shaft of the bolt so that the float and the bolt are coupled to each other, and the float comprises a marker line on its side to indicate a position of the end stopper relative to the graduated scale markings on the outer surface of the cylindrical body which indicate the relative change in length when the rotatable actuator wheel is rotated to adjust the length.

5. The external bone fixation system as claimed in claim 2, wherein the threaded rod from at least one of the custom struts is attached to the strut connector on the upper ring by inserting it into the pivoting ring-shaped holder and gripping the ring-shaped holder with two nuts around the threaded rod, one above and one below the pivoting ring-shaped holder so that once the nuts are tightened, no movement occurs between the threaded rod and the pivoting ring-shaped holder but the ring-shaped holder can freely pivot at the two hinges and the rotating clamp can freely rotate within the body cavity of the strut connector in such a way that the pivoting and rotating axes are orthogonal to each other,
- wherein a partially threaded post at the bottom of the cylindrical body of at least one of the custom struts is attached to the strut connector on the lower ring by inserting it into the pivoting ring-shaped holder and fastening with a nylon-insert lock nut around the threaded portion of the post,
- wherein during a gradual deformity correction phase, the nylon-insert lock nut is not fastened tightly against the pivoting ring-shaped holder but is kept very close to it without gripping it, which allows the at least one of the plurality of struts to rotate about its own longitudinal axis within the pivoting ring-shaped holder but without translational movement along the longitudinal axis of the at least one of the plurality of struts within the pivoting ring-shaped holder,
- wherein at the attachment of the at least one of the plurality of struts to the lower ring, there is free rotational movement about three axes orthogonal to each other providing three degrees of rotational freedom for the strut: first is the axis of the two hinges about which the pivoting movement of the ring-shaped holder occurs, second is the axis of rotation of the rotating clamp, and third is the axis of rotation of the smooth portion of the post of the custom strut within the pivoting ring-shaped holder, the three orthogonal axes intersecting each other at a single coincident point of universal rotation situated at the center of the ring-shaped holder, the point where a user can attach the at least one of the plurality of struts to the strut connector, and
- wherein the threaded rods are straight rods with threads on their external surface which can be used by the user to assemble the at least one of the plurality of struts by attaching one end of the threaded rod to the body of the at least one of the plurality of struts where the attachment is performed by threading it to the rotatable actuator wheel or quick connect mechanism and by attaching the other end of the threaded rod to the strut connector where the attachment is performed by inserting it into the pivoting ring-shaped holder and fastening it with two nuts, one above and one below the pivoting ring-shaped holder.

6. The external bone fixation system as claimed in claim 1, wherein at least one of the struts is a custom strut that comprises said threaded rod housed within a cylindrical body that has a bushing seated at its top, which provides attachment to a rotatable actuator wheel and also acts as a base on which the rotatable actuator wheel can rotate, and wherein the custom strut comprises a quick connect mechanism comprising a modified rotatable actuator wheel, a modified bushing, a split nut with two arms and a locking barrel so as to enable a user to quickly connect the threaded rod at any desired level within the cylindrical body of the at least one of the plurality of struts without having to thread it from one end,
- wherein the modified rotatable actuator wheel is coupled in its center to a hollow tube that has no internal threads, and therefore, does not mate with the threaded rod, and the lower end of the hollow tube includes a swaged retainer collar to keep it in place within the modified bushing so that the modified bushing acts as a base for the rotation of modified rotatable actuator wheel coupled to hollow tube and the swaged retainer collar, with its four flat cut surfaces, makes contact with a cantilever spring attached to the modified bushing to provide four position haptic feedback for every quarter turn,
- wherein the top surface of the modified rotatable actuator wheel has a groove each on two sides of the hollow tube and a slot each on the other two sides of the hollow tube,
- wherein the two arms of the split nut are identical to each other, have threads on the inner surface of their top half to mate with the threaded rod and threads on the outer surface of their top half to mate with the locking barrel and have a ridge at the lower end that articulates within the groove on the top surface of the modified rotatable actuator wheel,
- wherein a dual arm leaf spring is seated within the slot on the top of the modified rotatable actuator wheel, the arms of which press against the inner surface of the arms of the split nut to keep them open, and a bottom of the dual arm leaf spring grips the hollow tube at the gripping slots on either side of the hollow tube,
- wherein the locking barrel surrounding the two arms of the split nut has a knurled outer surface for gripping, and has threads on the upper half of its inner surface for engaging the threads on the outer surface of the two arms of the split nut so that the split nut remains closed in locked position, while the lower half of the inner surface of the locking barrel is smooth to accommodate the long leaf spring with a step cut recess at the lower end of lower half of the inner surface to accommodate the top end of the long leaf spring,
- wherein in the unlocked position, the locking barrel is around the lower half of the arms of the split nut allowing them to open fully while the long leaf spring is accommodated within the longitudinal slot on the outer surface of the arm of the split nut and smooth inner surface of the lower half of the locking barrel, and the arms of the split nut are kept wide open by the action of two dual arm leaf springs on either side so that the threads on the inner surface of the split nut do not make any contact with the threads of the threaded rod which allows the user to insert threaded rod into at least one of the plurality of struts smoothly without any resistance, and
- wherein once the threaded rod is inserted into the body of the at least one of the plurality of struts, it can be locked via quick connect mechanism by turning the locking barrel so that the threads on its inner surface engage the threads on the outer surface of the split nut closing the two arms of the split nut, while the threads on the inner surface of the split nut mate with the threads of the threaded rod so that turning of modified rotatable actuator wheel causes the threaded rod to translate, effecting a change in overall length of the at least one of the plurality of struts.

7. The external bone fixation system as claimed in claim 6, further comprising a recess in the middle of the ridge into which a long leaf spring is seated to retain each arm of the split nut in the groove of the modified rotatable actuator wheel, and the bottom half of the long leaf spring is held in a channel within the modified rotatable actuator wheel while the top half of the long leaf spring is accommodated within a longitudinal slot on the outer surface of each arm of split nut; and
  wherein in the locked position, the long leaf spring opens outwards so that the top end of the long leaf spring slips into the step cut recess at the lower end of the inner surface of the locking barrel, keeping the locking barrel in the locked position and it can be unlocked by pressing the long leaf spring on either side so that it is accommodated within the smooth inner surface of lower half of the locking barrel as the locking barrel is turned.

8. The external bone fixation system as claimed in claim 6, wherein the threaded rod from at least one of the custom struts is attached to the strut connector on the upper ring by inserting it into the pivoting ring-shaped holder and gripping the ring-shaped holder with two nuts around the threaded rod, one above and one below the pivoting ring-shaped holder so that once the nuts are tightened, no movement occurs between the threaded rod and the pivoting ring-shaped holder but the ring-shaped holder can freely pivot at the two hinges and the rotating clamp can freely rotate within the body cavity of the strut connector in such a way that the pivoting and rotating axes are orthogonal to each other,
  wherein a partially threaded post at the bottom of the cylindrical body of at least one of the custom struts is attached to the strut connector on the lower ring by inserting it into the pivoting ring-shaped holder and fastening with a nylon-insert lock nut around the threaded portion of the post,
  wherein during a gradual deformity correction phase, the nylon-insert lock nut is not fastened tightly against the pivoting ring-shaped holder but is kept very close to it without gripping it, which allows the at least one of the plurality of struts to rotate about its own longitudinal axis within the pivoting ring-shaped holder but without translational movement along the longitudinal axis of the at least one of the plurality of struts within the pivoting ring-shaped holder,
  wherein at the attachment of the at least one of the plurality of struts to the lower ring, there is free rotational movement about three axes orthogonal to each other providing three degrees of rotational freedom for the strut: first is the axis of the two hinges about which the pivoting movement of the ring-shaped holder occurs, second is the axis of rotation of the rotating clamp, and third is the axis of rotation of the smooth portion of the post of the custom strut within the pivoting ring-shaped holder, the three orthogonal axes intersecting each other at a single coincident point of universal rotation situated at the center of the ring-shaped holder, the point where a user can attach the at least one of the plurality of struts to the strut connector, and
  wherein the threaded rods are straight rods with threads on their external surface which can be used by the user to assemble the at least one of the plurality of struts by attaching one end of the threaded rod to the body of the at least one of the plurality of struts where the attachment is performed by threading it to the rotatable actuator wheel or quick connect mechanism and by attaching the other end of the threaded rod to the strut connector where the attachment is performed by inserting it into the pivoting ring-shaped holder and fastening it with two nuts, one above and one below the pivoting ring-shaped holder.

9. The external bone fixation system as claimed in claim 1, wherein the body comprises a threaded post at one end that can be inserted into one of the holes in the ring and be secured with a nut, and at the other end the body includes a round cavity that opens on both sides of the body, and wherein there are four lugs around the base of the threaded post that interdigitate with the four indentations around the holes in the ring to provide rotational stability for the strut connector.

10. The external bone fixation system as claimed in claim 9, wherein the round cavity in the body comprises two rotating clamps, one each on either side of the body, and a plate attached to the outer surface of the body that has two retainer pins protruding into the round cavity;
  wherein each rotating clamp comprises two separate arms forming a semi-circular support for the pivoting ring-shaped holder via two hinges on either side, each arm having a half disc-shaped base seated within the round cavity of the body of the strut connector.

11. The external bone fixation system as claimed in claim 10, wherein:
  the half disc-shaped base of each of the two arms is held together by a hoop and a securing pin to form a full disc that rotates freely within the round cavity while a circumferential groove on the outer surface of each of the half disc-shaped bases is engaged by the retainer pin to secure the half disc-shaped bases within the round cavity of the body; and/or
  the hinges are formed by the articulation of a gudgeon in each arm of the rotating clamp with the pintles on either side of the pivoting ring-shaped holder in such a way that the common axis of the two hinges about which the ring-shaped holder pivots, is orthogonal to the axis of the rotating disc formed by the binding of two half disc-shaped bases of the rotating clamp.

12. The external bone fixation system as claimed in claim 1, wherein at least two of said plurality of strut connectors are single strut connectors comprising a body with only one rotating clamp supporting a single pivoting ring-shaped holder, and whereby to avoid strut impingement on the limb, two struts of a pair can be attached to said single strut connectors placed a few holes apart on the ring to avoid strut impingement;
  wherein each single strut connector comprises a threaded post, a body that has a round cavity which opens facing outwards from the ring and provides seating for one rotating clamp that supports one pivoting ring-shaped holder and the rotating clamp is secured within the round cavity with a plate attached to the outer surface of the body that has two retainer pins protruding into the round cavity.

13. The external bone fixation system as claimed in claim 1, wherein while stabilizing a fracture with this external fixation system, the first and second rings attached to the respective first and second bone segments, are connected to each other using struts in the form of six threaded rods directly via the strut connectors where each threaded rod is directly inserted into a strut connector both at the upper end and at the lower end and secured by fastening nuts to the threaded rods.

14. The external bone fixation system as claimed in claim 13, wherein a pair of threaded rods attached to a strut connector on the first ring are attached at their other end to two adjacent strut connectors on the second ring, creating an inclination of the threaded rods that results in a hexapod configuration where alternating threaded rods can be left protruding beyond the pivoting ring-shaped holder to avoid impingement against each other.

\* \* \* \* \*